(12) United States Patent
Akagawa et al.

(10) Patent No.: US 12,234,634 B2
(45) Date of Patent: Feb. 25, 2025

(54) PORTABLE FACILITY PROVIDED WITH NATURAL ENERGY POWER GENERATION UNIT

(71) Applicant: NTN CORPORATION, Osaka (JP)

(72) Inventors: Mitsuru Akagawa, Kuwana (JP);
Ryosuke Karasawa, Kuwana (JP);
Tomohisa Okuno, Kuwana (JP);
Kaname Nishimura, Kuwana (JP)

(73) Assignee: NTN CORPORATION, Osaka (JP)

( * ) Notice: Subject to any disclaimer, the term of this patent is extended or adjusted under 35 U.S.C. 154(b) by 659 days.

(21) Appl. No.: 17/488,552

(22) Filed: Sep. 29, 2021

(65) Prior Publication Data
US 2022/0018114 A1    Jan. 20, 2022

Related U.S. Application Data

(63) Continuation of application No. PCT/JP2020/012630, filed on Mar. 23, 2020.

(30) Foreign Application Priority Data

Apr. 5, 2019  (JP) .................................. 2019-072826
Apr. 15, 2019  (JP) .................................. 2019-076832

(51) Int. Cl.
*E04B 1/348*    (2006.01)
*H02S 10/12*    (2014.01)
(Continued)

(52) U.S. Cl.
CPC .......... *E04B 1/34861* (2013.01); *H02S 10/12* (2014.12); *H02S 10/40* (2014.12);
(Continued)

(58) Field of Classification Search
CPC .. E04B 1/343; E04B 1/34317; E04B 1/34336; E04B 1/344; E04B 1/34869;
(Continued)

(56) References Cited

U.S. PATENT DOCUMENTS

| | | | |
|---|---|---|---|
| 6,179,358 B1 | 1/2001 | Hirayama et al. | |
| 7,230,819 B2 * | 6/2007 | Muchow ................. | F24S 25/70 361/825 |

(Continued)

FOREIGN PATENT DOCUMENTS

| | | |
|---|---|---|
| AT | 513 032 A4 | 1/2014 |
| CN | 1232909 A | 10/1999 |

(Continued)

OTHER PUBLICATIONS

Chinese Office Action issued in Chinese Patent Application No. 202080026524.1 dated Jun. 8, 2022.

(Continued)

*Primary Examiner* — Jessica L Laux

(57) ABSTRACT

A portable facility including: a power generation unit and a function unit, wherein the power generation unit includes a transportable first housing, at least one power generation device attached to the first housing which includes a top wall, a bottom wall, and a surrounding wall, the at least one power generation device being one or more of a wind power generation device, a solar power generation device, and a hydraulic power generation device, and the function unit includes a transportable second housing and an electric apparatus disposed inside the second housing and configured to be powered by the power generation unit to operate, the second housing including a top wall, a bottom wall, and a surrounding wall.

2 Claims, 15 Drawing Sheets

(51) Int. Cl.
*H02S 10/40* (2014.01)
*H02S 20/24* (2014.01)
*H02J 7/35* (2006.01)

(52) U.S. Cl.
CPC .... *H02S 20/24* (2014.12); *E04B 2001/34884* (2013.01); *H02J 7/35* (2013.01)

(58) Field of Classification Search
CPC ... E04H 2001/1283; E04H 5/02; H02S 20/20; H02S 20/22; H02S 20/23; H02S 20/24
See application file for complete search history.

(56) References Cited

U.S. PATENT DOCUMENTS

| | | | | |
|---|---|---|---|---|
| 7,793,467 | B1* | 9/2010 | Melton | E04H 5/04 |
| | | | | 52/173.3 |
| 8,739,478 | B1 | 6/2014 | Burtt et al. | |
| 9,157,418 | B2* | 10/2015 | Petersen | H02S 20/30 |
| 9,797,447 | B2 | 10/2017 | Aso et al. | |
| 10,219,447 | B1* | 3/2019 | DeCarli | B65D 88/005 |
| 10,666,185 | B2* | 5/2020 | Aikens | H02S 10/40 |
| 2006/0137348 | A1* | 6/2006 | Pas | F03D 9/19 |
| | | | | 60/641.1 |
| 2008/0196758 | A1* | 8/2008 | McGuire | H02S 10/40 |
| | | | | 290/55 |
| 2010/0018131 | A1 | 1/2010 | Green | |
| 2011/0146751 | A1* | 6/2011 | McGuire | F03D 9/007 |
| | | | | 136/245 |
| 2011/0283633 | A1 | 11/2011 | Wallace | |
| 2013/0036702 | A1 | 2/2013 | Pacetti et al. | |
| 2013/0186450 | A1* | 7/2013 | Smith | F24S 80/40 |
| | | | | 136/245 |
| 2013/0341934 | A1 | 12/2013 | Kawanishi | |
| 2014/0116870 | A1* | 5/2014 | Kamen | E04H 3/02 |
| | | | | 202/83 |
| 2014/0306459 | A1 | 10/2014 | Aso et al. | |
| 2016/0036375 | A1 | 2/2016 | Ansari | |
| 2016/0059105 | A1 | 3/2016 | Scade Garcia | |
| 2018/0212432 | A1* | 7/2018 | Byrnes | F03D 9/007 |

FOREIGN PATENT DOCUMENTS

| | | | | |
|---|---|---|---|---|
| CN | 102635253 | A | 8/2012 | |
| CN | 103891130 | A | 6/2014 | |
| CN | 205081718 | U | 3/2016 | |
| CN | 105804251 | A | 7/2016 | |
| CN | 208380156 | U | 1/2019 | |
| CN | 208380157 | U | 1/2019 | |
| DE | 200 03 242 | U1 | 5/2000 | |
| EP | 2 535 471 | A1 | 12/2012 | |
| JP | 8-26018 | A | 1/1996 | |
| JP | 9-1159340 | A | 6/1997 | |
| JP | 2006-322445 | A | 11/2006 | |
| JP | 3158682 | | 4/2010 | |
| JP | 3171044 | U | 10/2011 | |
| JP | 2013-113379 | A | 6/2013 | |
| JP | 3190095 | U | 4/2014 | |
| JP | 2014-84718 | A | 5/2014 | |
| JP | 2014-125808 | A | 7/2014 | |
| JP | 2017-89604 | A | 5/2017 | |
| JP | 3215618 | | 4/2018 | |
| WO | WO 2013/006164 | A1 | 1/2013 | |
| WO | WO-2015164913 | A1 * | 11/2015 | ............ H02S 30/20 |
| WO | WO 2016/033378 | A1 | 3/2016 | |

OTHER PUBLICATIONS

International Search Report for International Patent Application No. PCT/JP2020/012630 dated Jun. 16, 2020.
International Preliminary Report on Patentability and Written Opinion for International Patent Application No. PCT/JP2020/012630 dated Oct. 14, 2021.
Extended and Supplementary European Search Report dated Nov. 30, 2022 in European Patent Application 20783627.1 (7 pages).
Chinese Office Action dated Oct. 14, 2022 in Chinese Patent Application No. 202080026524.1 (6 pages; 6 pages English translation).
Japanese Office Action dated Dec. 6, 2022 in Japanese Patent Application No. 2019-072826 (3 pages; 3 pages English translation).

* cited by examiner

PORTABLE FACILITY PROVIDED WITH NATURAL ENERGY POWER GENERATION UNIT

CROSS REFERENCE TO THE RELATED APPLICATION

This application is a continuation application, under 35 U.S.C. § 111(a), of international application No. PCT/JP2020/012630, filed Mar. 23, 2020, which claims priority to Japanese patent application No. 2019-072826, filed Apr. 5, 2019 and Japanese patent application No. 2019-076832, filed Apr. 15, 2019, the entire disclosures of all of which are herein incorporated by reference as a part of this application.

BACKGROUND OF THE INVENTION

Field of the Invention

The present invention relates to a portable facility including a power generation unit which uses natural energy.

Description of Related Art

A conventionally known mobile shop is a modified vehicle having a loading bed altered to have a facility and a function as a shop (for example, see Patent Document 1). It has been proposed that in a case where an electric apparatus is mounted on a loading bed of a vehicle, a vehicular storage battery is used as a power source for the electric apparatus (for example, see Patent Document 2). Therefore, also in a case where a shop is set up on a loading bed of a vehicle, a vehicular storage battery may be employed for an electric apparatus used in the shop.

RELATED DOCUMENT

Patent Document

[Patent Document 1] JP Laid-open Patent Publication No. 2006-322445
[Patent Document 2] JP Laid-open Patent Publication No. H9-159340

SUMMARY OF THE INVENTION

In contrast, in a case where the facility is continuously placed at a same site for a relatively long period of time, it is not necessary to include a vehicle for transport, and it is desirable to set up the facility separately from a vehicle in view of the cost for such a vehicle and the effect on business. In such a case, however, a vehicular storage battery cannot be used, and thus it becomes difficult to secure power supply in unelectrified areas and/or disaster areas where portable facilities are particularly needed. It is conceivable that a power generator which uses fossil fuel is instead installed in such a facility; in this case, fuel supply is necessary.

In order to solve the above problem, an object of the present invention is to provide a portable facility having high transportability and capable of being used even in an area where it is difficult to secure power supply.

The present invention provides a portable facility including:
  a power generation unit including a transportable first housing and at least one power generation device attached to the first housing, the first housing including a top wall, a bottom wall, and a surrounding wall, the at least one power generation device being one or more of a wind power generation device, a solar power generation device, and a hydraulic power generation device, and
  a function unit including a transportable second housing and an electric apparatus disposed inside the second housing and configured to be powered by the power generation unit to operate, the second housing including a top wall, a bottom wall, and a surrounding wall.

The term "transportable" as used herein means that the top wall, the bottom wall, and the surrounding wall of each housing are not fixed to the ground, other installation, or the like.

Preferably, the power generation unit includes all of the wind power generation device, the solar power generation device, and the hydraulic power generation device. Further, the function unit may include a plurality of electric apparatuses having different functions.

According to this constitution, the respective housings are capable of being transported, so that the portable facility has high transportability. Further, since the facility includes a natural energy power generation device such as a wind power generation device, a solar power generation device, and/or a hydraulic power generation device in the power generation unit, it is possible to use an electric apparatus even in areas where it is difficult to secure power supply such as unelectrified areas and disaster areas, so that the facility can be more easily operated. In particular, where the facility includes all of the wind power generation device, the solar power generation device, and the hydraulic power generation device, the power generation amount is less likely to be limited by natural environment such as weather conditions and topographical features, and/or time of the day or night, so that the facility can be set up and be operated with a greater applicability to a wide range of areas.

In one embodiment of the present invention, the power generation unit may include a system power source connection part configured to receive power supply from a system power source. According to this constitution, when the facility is set up at a site where the facility can be connected to a system power source, it is possible to use the power generation unit as a main power source for the function unit, while using the system power source to compensate for a temporary shortage of power generation when it occurs, or to use the system power source as a main power source for the function unit, while using the power generation unit as a backup power source in case of power outage.

In one embodiment of the present invention, the first housing and the second housing may be freight containers. According to this constitution, since the respective units are constituted by containers suitable for transport, the units can be transported by different transportation equipments such as automobiles, railroad cars, ships, and airplanes. Since the freight containers have excellent robustness, it is possible to prevent damage due to vibration and/or impact during transport. Because of the robustness, the freight containers also have excellent crime prevention performance against intrusion from the outside. Therefore, it is possible to reduce the cost for operating the facility. Further, since the first housing and the second housing are constituted by containers having a same size, it is possible to effectively use a freight space and an installation space.

In one embodiment of the present invention, the power generation unit may include the solar power generation device,
  the solar power generation device may be capable of being housed in the first housing, which is the freight container, and include a solar panel configured to be placed on an upper side of the top wall of the first housing to perform solar power generation, a roller is attached to the solar panel, an external rail is provided on the upper side of the top wall of the first housing, an internal rail is provided inside the first housing and is supported by the top wall, and a connecting rail member configured to connect the external rail and the internal rail with a door of the first housing opened is provided in a connection-releasable manner, so that the solar panel is allowed to be moved with the roller to be guided along the internal rail, the connecting rail member, and the external rail.

According to this constitution, the connecting rail member configured to connect the external rail and the internal rail with the door of the freight container (first housing) opened is provided in a connection-releasable manner, so that the container can be transported with the connecting rail member removed from the external rail and the internal rail to release the connection and with the door of the container closed. When the container is transported, the container can be easily transported to an area of demand with the solar panel supported by the internal rail disposed on a ceiling inside the container. Since the solar panel is housed in the container during transport of the container, the solar panel is not subjected to impact from outside and thus can be easily transported. The area of demand may be, for example, a site where the solar panel is used such as unelectrified areas in developing countries and affected areas of disasters and the like.

When the solar panel is to be placed on the upper side of the top wall, which is a roof of the container, the connecting rail member is placed to connect the external rail and the internal rail with the door of the container opened. Thus, the solar panel is guided and moved by the roller from the internal rail sequentially to the connecting rail member and then to the external rail, so that the solar panel is easily placed on the roof of the container. This makes it possible to facilitate a deployment operation of the solar panel on site and to shorten a time required to place the panel. In a reverse procedure to the above-described procedure, the solar panel can be easily received into the container.

The solar panel may include a plurality of rollers attached to opposing two sides of the solar panel, the plurality of rollers being rotatable about an axis perpendicular to the two sides, each of the internal rail, the external rail, and the connecting rail member having a groove-shaped cross section so as to define a rail groove therein, and in the solar panel, at least one roller of the plurality of rollers may be guided into the rail groove of at least one of the internal rail, the external rail, and the connecting rail member, while at least one other roller of the plurality of rollers may be guided on an outer surface of at least one of the internal rail, the external rail, and the connecting rail member.

In this case, the solar panel supported by the internal rail can be guided by the plurality of rollers sequentially into the respective rail grooves of the connecting rail member and the external rail to be easily deployed on the roof of the container. In a reverse procedure to the above-described procedure, the solar panel can be easily received into the container.

Each of the internal rail, the external rail, and the connecting rail member may include a web and flanges extending in a bending manner from opposite edge portions of the web so as to define the rail groove, the first housing may include a pair of internal rails, a pair of external rails, and a pair of connecting rail members, each pair being arranged such that opened surfaces of rail grooves of that pair face each other, the rail grooves of each pair are configured to guide the plurality of rollers attached in pairs to the two sides of the solar panel, each of the connecting rail members includes an upper rail part having a rail groove to be connected to a rail groove of a corresponding external rail, a lower rail part having a rail groove to be connected to a rail groove of a corresponding internal rail, and a middle rail part having a rail groove connected to tip end portions of the rail groove of the upper rail part and the rail groove of the lower rail part, of the plurality of rollers, rollers located at frontward positions in a movement direction are guided into the rail grooves of the connecting rail members, and each of the connecting rail members may have a cutout formed in in one of the flanges of the middle rail part of that connecting rail member which is located outside, the cutout being configured to allow one of the rollers located at the frontward positions in the movement direction to exit the rail groove of that connecting rail member, so that a posture of the solar panel can be changed.

In this case, when the solar panel is being deployed, the rollers at the frontward positions in the movement direction are guided into the rail grooves of the connecting rail members and exit the rail grooves from the cutouts formed in the flanges of the middle rail parts which are located outside. This makes it possible to displace the solar panel to a desired angle around the rollers staying inside the rail grooves of the connecting rail members as fulcra and to raise up the solar panel so as to be brought up to the roof of the container. Reversely, when the solar panel is being housed, the rollers at the frontward positions in the movement direction are guided from the external rails into the rail grooves of the connecting rail members and are allowed to exit from the cutouts formed in the flanges which are located outside. This makes it possible to change the posture of the solar panel to a desired angle around the rollers staying inside the rail grooves of the connecting rail members as fulcra and to move the solar panel into the container.

Of the plurality of rollers, rollers located at rearward positions in the movement direction may be guided on outer surfaces of webs of the connecting rail members, and each of the connecting rail members may have a cutout formed in one of the flanges of the middle rail part of that connecting rail member which is located outside, the cutout being configured to allow one of the rollers located at the rearward positions in the movement direction to be inserted into the rail groove of that connecting rail member.

In this case, when the solar panel is being deployed, the rollers at the rearward positions in the movement direction are guided on the outer surfaces of the webs of the connecting rail members and are inserted into the rail grooves from the cutouts formed in the flanges of the middle rail parts which are located outside. This makes it possible, with the solar panel kept in a desired deployment posture, to smoothly guide the respective rollers into the respective rail grooves of the external rails. Reversely, when the solar panel is being housed, the rollers at the rearward positions in the movement direction are guided on the outer surfaces of the webs of the connecting rail members and are inserted into the rail grooves from the cutouts formed in the flanges of the middle rail parts which are located outside, so that with the solar panel kept in a desired storage posture, the respective rollers can be smoothly guided into the respective rail grooves of the internal rails.

The connecting rail member may be formed in a circular arc shape. In this case, the roller attached to the solar panel can be smoothly and speedily guided along the connecting rail member having the circular arc shape.

The external rail may include a stopper member configured to restrict movement of the solar panel. In this case, it is possible to restrict movement of the solar panel so as to prevent the solar panel from unintendedly moving out of the external rail.

One or both of the wind power generation device and the hydraulic power generation device may be housed in the container which houses the solar panel. In this case, transport efficiency can be improved as compared to a case where the wind power generation device and the hydraulic power generation device are housed in another container or the like to be transported. This constitution is also advantageous in securing electric power.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views. In the figures.

DESCRIPTION OF THE EMBODIMENTS

Figure 1:
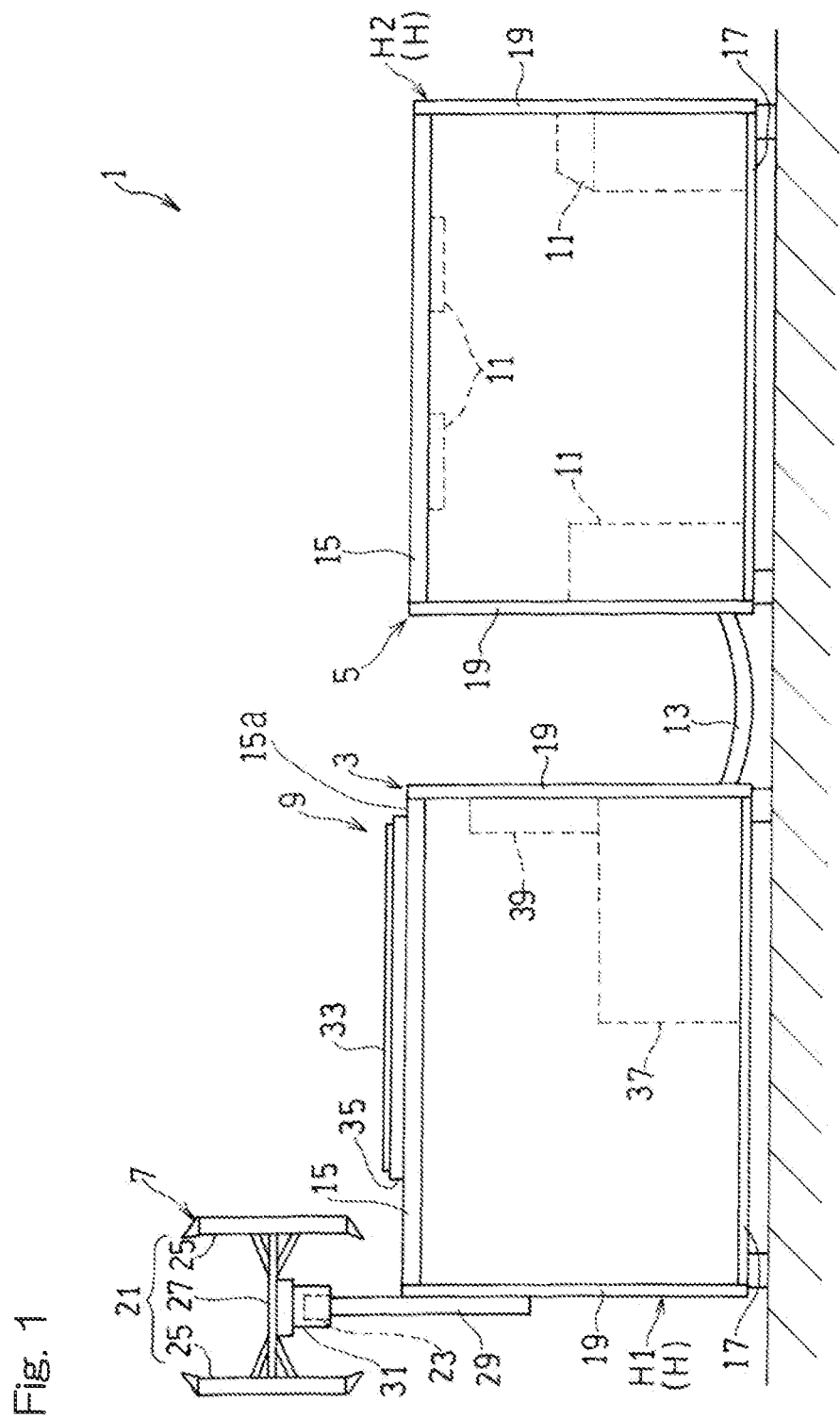
FIG. 1 is a front view showing a schematic configuration of a portable facility according to an embodiment of the present invention.

An embodiment of the present invention will be described with reference to the drawings. FIG. 1 shows a portable facility 1 according to one embodiment of the present invention. The portable facility 1 includes a power generation unit 3 and a function unit 5. The power generation unit 3 includes a first housing H1, and a wind power generation device 7 and a solar power generation device 9 attached to the first housing H1. The function unit 5 includes a second housing H2 and an electric apparatus 11 disposed inside the second housing H2. The power generation unit 3 and the function unit 5 are connected by a power supply cable 13, and the electric apparatus 11 of the function unit 5 is supplied with power from the power generation unit 3 to operate.

Figure 2:
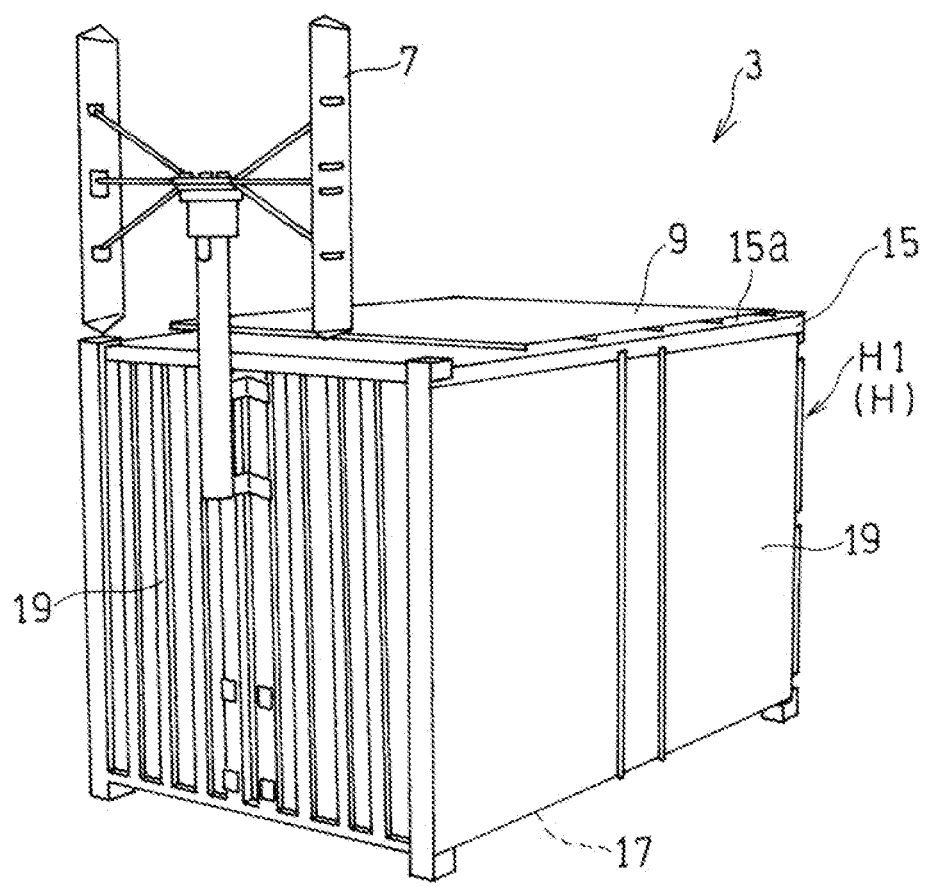
FIG. 2 is a perspective view of a power generation unit used in the portable facility of FIG. 1.

As shown in FIG. 2, the first housing H1 includes a substantially rectangular top wall 15, a substantially rectangular bottom wall 17, and four surrounding walls 19 disposed between the top wall 15 and the bottom wall 17 and has a substantially cube shape as a whole. The second housing H2 also has the same configuration as that of the first housing H1. More specifically, in the present embodiment, freight containers having a same configuration are used as the first housing H1 and the second housing H2. In the following description, the first housing H1 and the second housing H2 are collectively described with referring to a "housing H," unless the distinction between them is necessary in particular.

The term "freight container" as used herein may preferably refer to a container having a standard dimension for freight transport, for example, a container having a dimension meeting a domestic standard for container transport. The container having a "standard dimension" as used herein may be, for example, a container having a dimension meeting a standard established by a domestic administrative body or international authorities such as the International Organization for Standardization (ISO), or a JR container which has been established as a de facto standard for rail freight containers in Japan.

Since the housing H is constituted by a freight container, the housing can be transported by different transportation equipments such as automobiles, railroad cars, ships, and airplanes. Since the freight container has excellent robustness, it is possible to prevent damage due to vibration and/or impact during transport. Because of the robustness, the freight container also has excellent crime prevention performance against intrusion from the outside. Therefore, it is possible to reduce the cost for operating the facility. In particular, since both housings H1, H2 have a same configuration, i.e., are constituted by containers having a same size, it is possible to effectively use a freight space and an installation space in a case where a plurality of units of the containers are transported and installed.

As shown in FIG. 1, the wind power generation device 7 of the present embodiment includes a wind turbine 21 and a power generator 23 which is driven by the wind turbine 21 to generate electric power. The wind turbine 21 is constructed as a vertical-axis wind turbine. Specifically, the wind turbine 21 includes a plurality of (two in this example) blades 25 and a blade support body 27 for supporting the blades 25. The respective blades 25 extend in a vertical direction, and the blade support body 27 is supported at an upper end of a support column 29 through a non-illustrated bearing so as to be rotatable about a vertical axis. The two blades 25 are disposed at positions having a phase shift of 180° around the axis of the support column 29. In this example, the support column 29 is fixed to an upper center part of one surrounding wall of the surrounding walls 19 of the first housing H1.

The power generator 23 of the wind power generation device 7 is disposed inside a power generator casing 31 attached to an upper portion of the support column 29. A fixed ring of the bearing is attached to the power generator casing 31, and a rotary ring of the bearing is coupled to the blade support body 27. As the wind turbine 21 rotates, a rotor of the power generator 23 rotates along with the rotary ring inside the power generator casing 31, so that the power generator 23 generates electric power. The power generator 23 may be, for example, an induction power generator or a synchronous power generator.

Since the vertical-axis wind turbine 21 can receive wind to generate electric power, albeit its relatively small configuration, it is suitable as a wind turbine 21 for the wind power generation device 7 provided to the portable facility 1. It should be noted that the wind turbine 21 may be a horizontal-axis wind turbine.

The solar power generation device 9 of the present embodiment includes a solar panel 33 which receives sunlight to perform photoelectric conversion and a panel mount 35 for attaching the solar panel 33 to the housing H. In this example, the solar panel 33 is attached to an upper side 15a of the top wall 15 of the housing H through the panel mount 35. The solar panel 33 may be disposed on a surrounding wall 19 of the first housing H1 depending on the direction of solar radiation and installation environment or may be deployed around the first housing H1. It should be noted that although the panel mount 35 of the illustrated example has a simple plate-like configuration, the panel mount 35 may include a mechanism capable of inclining the solar panel 33 in accordance with the direction of the sun.

Although the present embodiment is described with reference to an example in which the power generation unit 3 of the portable facility 1 includes the wind power generation device 7 and the solar power generation device 9, the power generation unit 3 may include a hydraulic power generation device (not illustrated), in addition to these power generation devices. The hydraulic power generation device includes a water turbine which is placed in water of a water channel and is rotated by flow of the water and a power generator which is driven by rotation of the water turbine. Where the portable facility 1 includes a hydraulic power generation device, for example, the housing H is placed by the side of the water channel, and the hydraulic power generation device is supported by a surrounding wall 19 of the housing H which is located on the side of the water channel.

It is sufficient that the power generation unit 3 includes at least one power generation device, namely, the wind power generation device 7, the solar power generation device 9, and/or the hydraulic power generation device. Where the portable facility 1 includes all of the wind power generation device 7, the solar power generation device 9, and the hydraulic power generation device, however, the power generation amount is less likely to be limited by natural environment such as weather conditions and topographical features, and/or time of the day or night, so that the facility can be set up and be operated with a greater applicability to a wide range of areas.

The power generation unit 3 may further include a system power source connection part for receiving power supply from a system power source. Provision of the system power source connection part in the power generation unit 3 makes it possible, when the facility is set up at a site where the facility can be connected to a system power source, to use the power generation unit 3 as a main power source for the function unit 5, while using the system power source to compensate for a temporary shortage of power generation when it occurs, or to use the system power source as a main power source for the function unit 5, while using the power generation unit 3 as a backup power source in case of power outage.

As described above, the function unit 5 of the portable facility 1 includes an electric apparatus 11 which is powered by the power generation unit 3 to operate. A plurality of electric apparatuses 11 having different functions may be disposed inside the second housing H2 of the function unit 5. When the function unit 5 is constituted as a mobile shop (or a mobile store), for example, the function unit may include a lighting apparatus for illuminating the interior of the second housing H2, a refrigerator, and a cash register as the electric apparatuses 11.

The function unit 5 of the portable facility 1 having the above construction can be used as, for example, a shop for selling food and/or convenience goods in a depopulated area. Further, the function unit 5 of the portable facility 1 can be constituted as a unit having various functions as described later to be used as a shop for other applications than selling goods. Furthermore, the portable facility 1 according to the present embodiment may include a plurality of function units 5 for a single power generation unit 3. In such a case, the respective function units 5 may have a same function or different functions.

Figure 3:
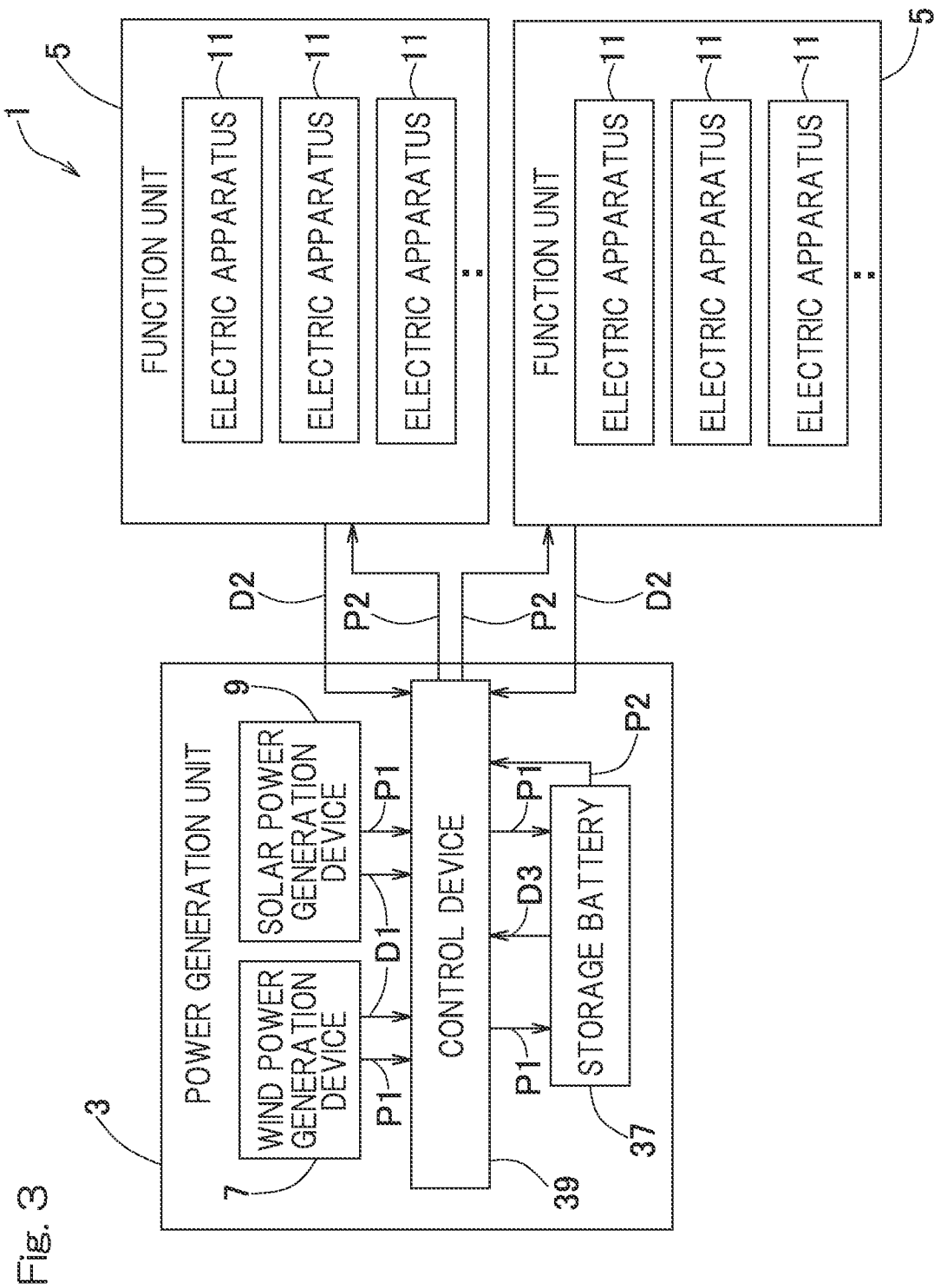
FIG. 3 is a block diagram schematically showing a control system of the portable facility of FIG. 1.

In the present embodiment, the power generation unit 3 includes a storage battery 37 and a control device 39 inside the first housing H1. As shown in FIG. 3, the storage battery 37 stores electric power P1 generated by the wind power generation device 7 and the solar power generation device 9 and supplies the stored electric power P2 to the electric apparatus 11 of the function unit 5 as needed. The control device 39 controls an input of the electric power P1 generated by the power generation devices 7, 9 to the storage battery 37 and an output of the electric power P2 from the storage battery 37 to the function unit 5 (electric apparatus 11). For example, the control device 39 includes an AC/DC converter for converting alternating current (AC) electric power generated by the power generation devices 7, 9 into electric power having a voltage which can be stored in the storage battery 37 as well as an inverter for converting the electric power stored in the storage battery 37 into sine wave AC similar to commercial AC power or into square wave AC.

The control device 39 may further include: a power generation monitoring section for monitoring a power generation amount of each power generation device 7, 9 in the power generation unit 3; a power consumption monitoring section for monitoring a power consumption amount of each electric apparatus 11 in the function unit 5; a storage battery monitoring section for monitoring a residual capacity of the storage battery 37; an operation estimating section for estimating an operable time of the function unit 5 on the basis of power generation amount data D1, power consumption amount data D2, and residual capacity data D3 obtained by these monitoring sections; and an operable time displaying section for displaying the operable time estimated by the operation estimating section. Where a plurality of function units 5 are provided for a single power generation unit 3 as described above, the control device 39 of the power generation unit 3 may be capable of adjusting proportions of power supplies to the respective function units 5 as needed.

The following describes examples of the functions and applications of the function unit 5 of the portable facility 1. The functions and applications of the function unit 5 of the portable facility 1, however, are not limited to these examples.

When a natural disaster (such as earthquakes and floods) occurs, the portable facility 1 may be transported to an affected area and serve as food service equipment including electric apparatuses 11 such as a water purification device, a kitchen appliance, and a cooking device in the function unit 5. In such a case, electricity generated in the power generation unit 3 may be used to supply power to a lighting in that area, to charge a mobile device, or to power a disaster relief device such as the water purification device.

Similarly, when a natural disaster occurs, the portable facility 1 may be transported to an affected area and serve as housing equipment (temporary dwelling) including electric apparatuses 11 necessary for daily life such as a lighting device, a water purification device, a cooking device, and an air conditioning device in the function unit 5.

When a temporary railroad station is opened during a tourist season, the portable facility 1 including an automatic ticket gate as an electric apparatus 11 in the function unit 5 may be transported to and set up in the temporary station.

The portable facility 1 including equipment such as an automated teller machine (ATM) and a coin locker as electric apparatuses 11 in the function unit 5 may be transported to an outdoor event site and set up during an event period.

The portable facility 1 including a book shelf, and an indoor lighting device and/or a loaning system as electric apparatuses 11 in the function unit 5 may be used as a mobile library.

The portable facility 1 including a medical device in the function unit 5 may be used as a mobile clinic.

The portable facility 1 including a desk, a chair, a personal computer, a projector, a monitor, or the like in the function unit 5 may be used as a meeting room or a study room.

It should be noted that the function of the function unit 5 which is set at the time of setting up the portable facility 1 may be changed depending on the needs in the area of demand later on. That is, the function of the function unit 5 can be changed by suitably changing various electric apparatuses 11 disposed inside the function unit 5 and/or other accessories.

Figure 4:
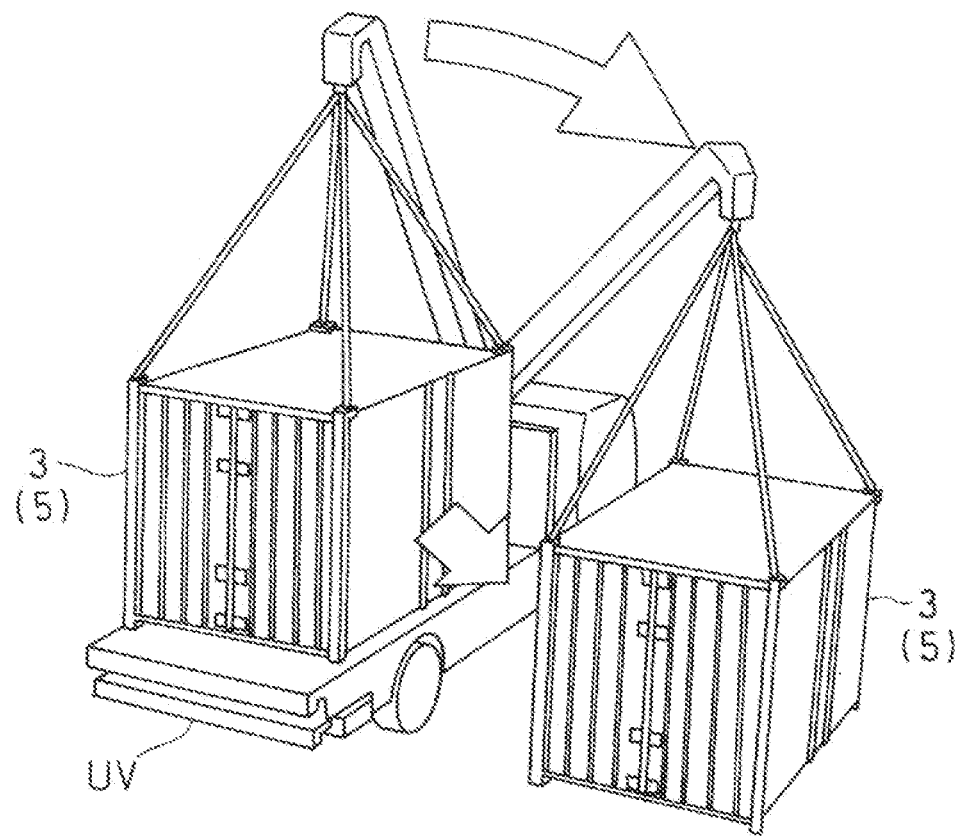
FIG. 4 is a perspective view showing an exemplary application of the portable facility of FIG. 1.

The portable facility 1 according to the present embodiment can be separated into the power generation unit 3 and the function unit 5 so as to be easily transported by logistics or transportation equipments such as automobiles, railroad cars, ships, and airplanes. Where they are transported by transportation equipments other than automobiles (i.e. railroad cars, ships, airplanes, or the like), the power generation unit 3 and the function unit 5 may be transported to a railroad station, a port, or an airport located near an installation site of the facility, and then be transported by an automobile to the installation site of the facility. In a case where the respective units are transported by an automobile, for example, the automobile is a unic vehicle UV (crane truck) as shown in FIG. 4. After the respective units 3, 5 is transported by a unic vehicle UV to an installation site, the respective units are unloaded from the vehicle by a crane of the unic vehicle UV. The operation of unloading the respective units of the portable facility 1 from different transportation equipments may be carried out by using a forklift or a gantry crane.

Next, a portable facility 1 according to another embodiment of the present invention will be described. This embodiment is the same as the embodiment shown in FIG. 1 except that when the first housing H1 of the power generation unit 3 is a freight container, and the power generation unit 3 includes a solar power generation device 9, the solar power generation device 9 is attached to the first housing H1 in a different manner. Therefore, the following description will only describe how the solar power generation device 9 is attached to the first housing H1 with reference to FIG. 5 to FIG. 22, and description of other features will be omitted.

Figure 5:
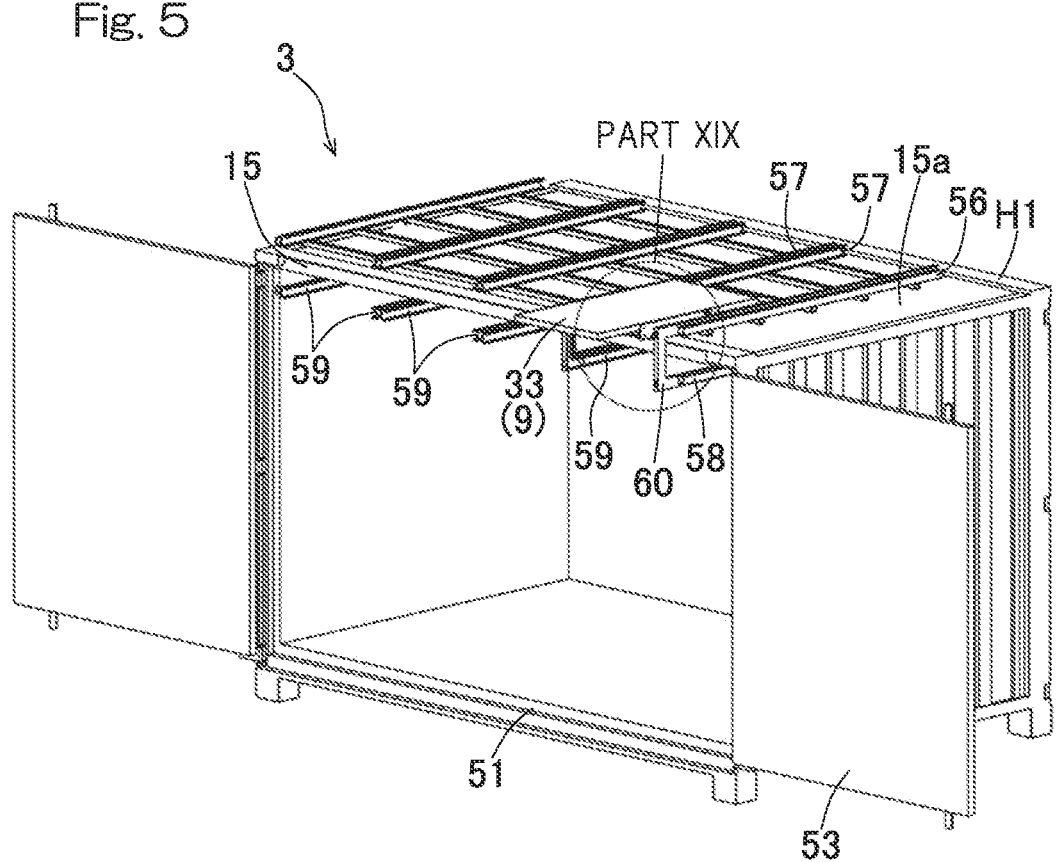
FIG. 5 is a perspective view of a power generation unit (solar power generation device) used in a portable facility according to another embodiment of the present invention.
Figure 22:
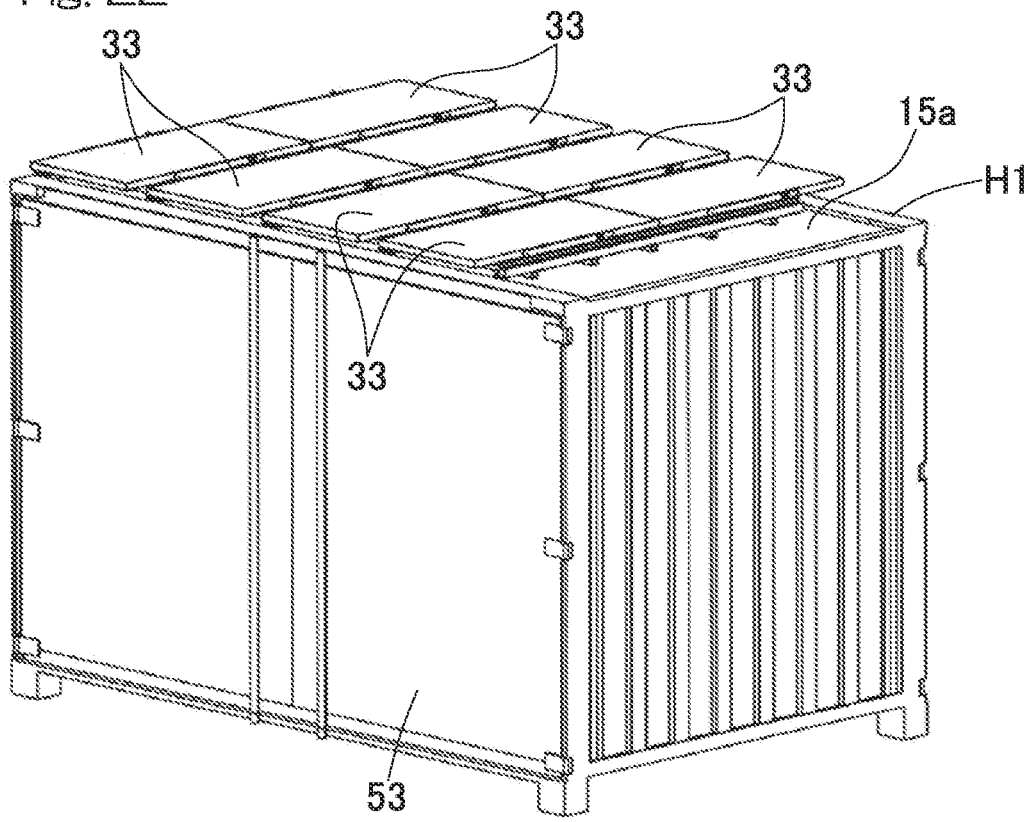
FIG. 22 is a perspective view showing a final configuration of a power generation unit including a plurality of solar panels arranged on the upper side of the top wall.

As shown in FIG. 5 and FIG. 22, the solar power generation device 9 according to the present embodiment includes a plurality of (eight in this example) solar panels 33 which can be accommodated in the first housing H1, which is a freight container, and are configured to be disposed on the upper side 15a of the top wall 15, which is a roof of the first housing H1, to perform solar power generation. That is, the solar power generation device 9 is constituted as a container-accommodated mobile power generation device.

Container

Figure 6:
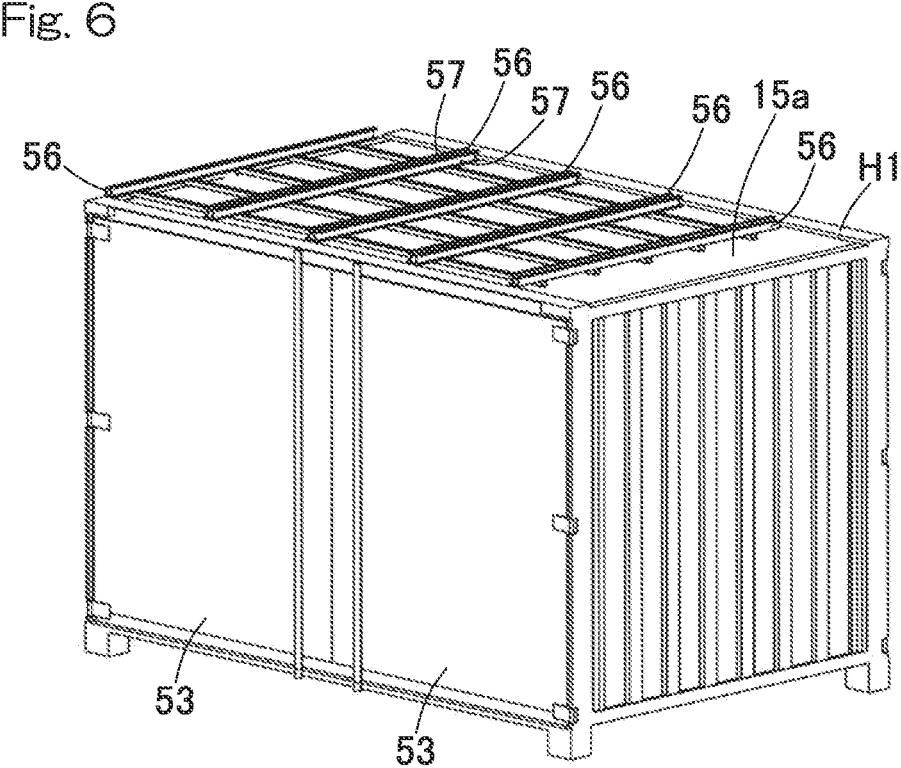
FIG. 6 is a perspective view of a first housing (freight container) of the power generation unit of FIG. 5 with a solar panel housed inside the first housing.

As shown in FIG. 5 and FIG. 6, in this example, a container which complies with the ISO standard for 12-ft dry containers is used as the freight container constituting the first housing H1. The first housing H1 of this embodiment has openings 51 on opposite sides and is provided with doors 53 of a double door design for opening and closing the respective openings 51.

Solar Panel

Figure 19:
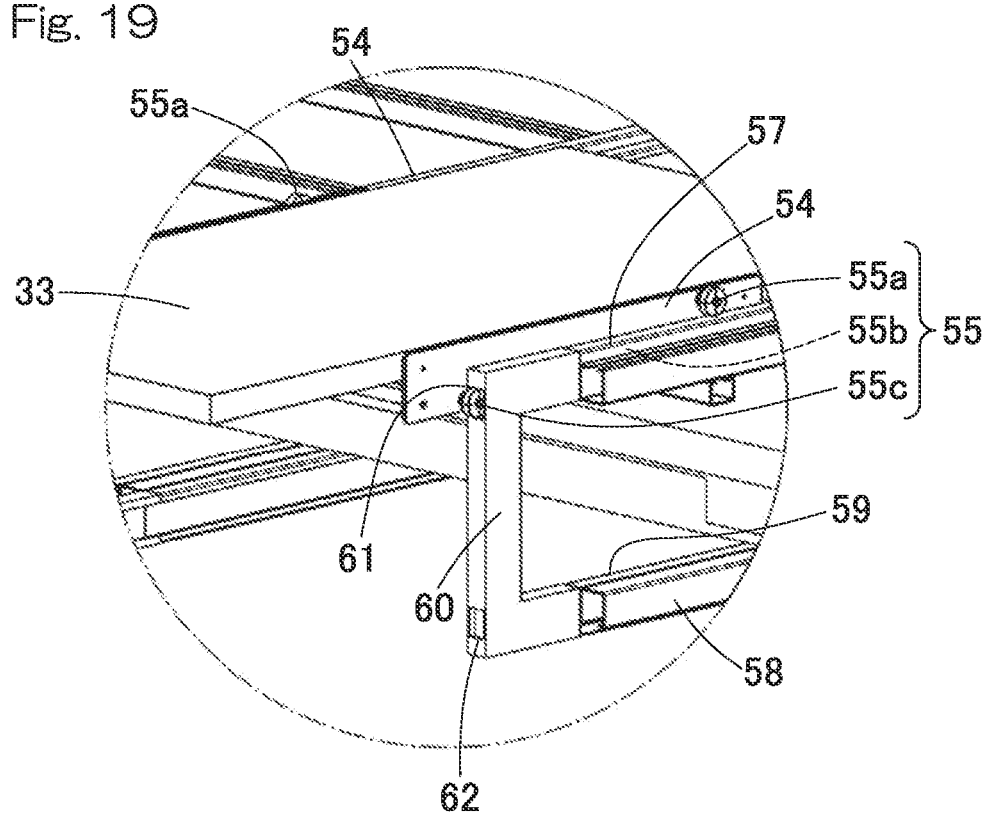
FIG. 19 is a partially enlarged perspective view of the connecting rail member and the like of FIG. 5.

Each solar panel 33 includes a plurality of photovoltaic cells (not illustrated) arranged into a panel shape. As shown in FIG. 19 (an enlarged view of part XIX of FIG. 5) and FIG. 8, the solar panel 33 has left and right end portions to which metal fittings 54 having a rectangular flat-plate shape are fixed, and a plurality of rollers 55 are attached to each of the metal fittings 54. On each of opposing two sides of the solar panel 33, the plurality of rollers 55 are attached through a metal fitting 54 so as to be rotatable about an axis perpendicular to the two sides. The plurality of rollers 55 includes a small-diameter roller 55*a*, a large-diameter roller 55*b*, and a small-diameter roller 55*c* sequentially arranged at predetermined intervals along a longitudinal direction of each metal fitting 54.

Each metal fitting 54 supports the small-diameter rollers 55*a*, 55*c* at a frontward position and a rearward position in a movement direction and includes, between the small-diameter rollers 55*a*, 55*c*, the large-diameter roller 55*b* having an outer periphery having a larger diameter than the diameter of the small-diameter rollers 55*a*, 55*c*. The small-diameter rollers 55*a*, 55*c* are constituted by same parts. It should be noted that the small-diameter roller 55*a* at the frontward position in the movement direction is supported near a proximal end, in a transverse direction, of the metal fitting 54 (i.e. at a position substantially along a width surface of the solar panel 33), and the large-diameter roller 55*b* and the small-diameter roller 55*c* at the rearward position in the movement direction are supported at positions at a proximal end portion, in the transverse direction, of the metal fitting 54.

When the solar panel 33 is being deployed, the small-diameter roller 55*a* serves as a roller at a frontward position in a movement direction, and the small-diameter roller 55*c* serves as a roller at a rearward position in the movement direction. Reversely, when the solar panel 33 is being housed, the small-diameter roller 55*c* serves as a roller at a frontward position in a movement direction, and the small-diameter roller 55*a* serves as a roller at a rearward position in the movement direction. The following description will be made with reference to a case where the solar panel 33 is being deployed, unless otherwise noted.

Rails and The Like

As shown in FIG. 5, the solar panel 33 is constructed in such a way that with the doors 53 of first housing H1 opened, the solar panel 33 can be moved with the plurality of rollers 55 to be guided along internal rails, connecting rail members, and external rails, all of which will be described later.

External Rail

Figure 7:
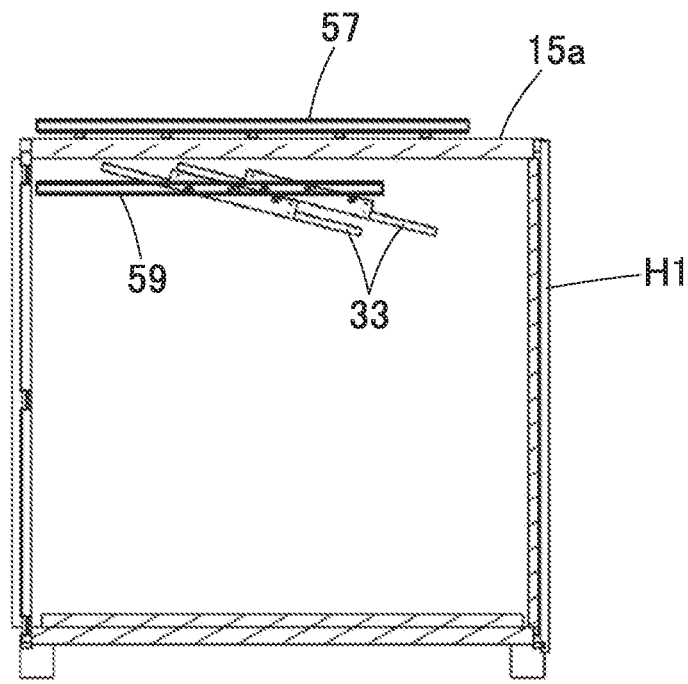
FIG. 7 is a sectional view showing the inside of the first housing with the solar panel housed therein.
Figure 8:
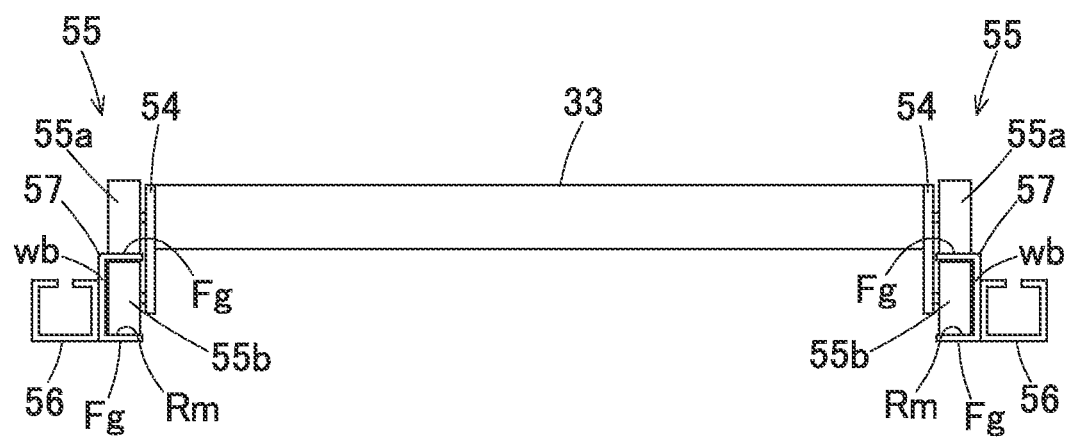
FIG. 8 is a sectional view of an external rail and the like disposed on an upper side of a top wall, which is a roof of the first housing.

As shown in FIG. 6 to FIG. 8, a plurality of (five in this example) attachment metal fittings 56 extending in a front-rear direction of the first housing (a depth direction of the first housing H1) are attached at equal intervals on the upper side 15*a* of the top wall 15, which is a roof of the first housing H1. One external rail 57 is attached to each of the attachment metal fittings 56, 56 located at left and right ends. As for the attachment metal fitting 56 located at the right end, the external rail 57 is attached to a left-side surface of the attachment metal fitting 56. As for the attachment metal fitting 56 located at the left end, the external rail 57 is attached to a right-side surface of the attachment metal fitting 56. To the other three attachment metal fittings 56, external rails 57, 57 are attached to left- and right-side surfaces of the respective attachment metal fittings 56.

As shown in FIG. 8, each external rail 57 has a groove-shaped cross section so as to define a rail groove Rm therein and includes a web Wb and flanges Fg, Fg extending in a bending manner from opposite edge portions of the web Wb so as to define the rail groove Rm. For example, the external rail 57 is constituted by channel steel. The external rails 57 are arranged in pairs such that opened surfaces of the rail grooves Rm of each pair face each other, and the plurality of rollers 55 attached in pairs to the two sides of each solar panel 33 are guided in the facing rail grooves Rm, Rm.

Figure 20:
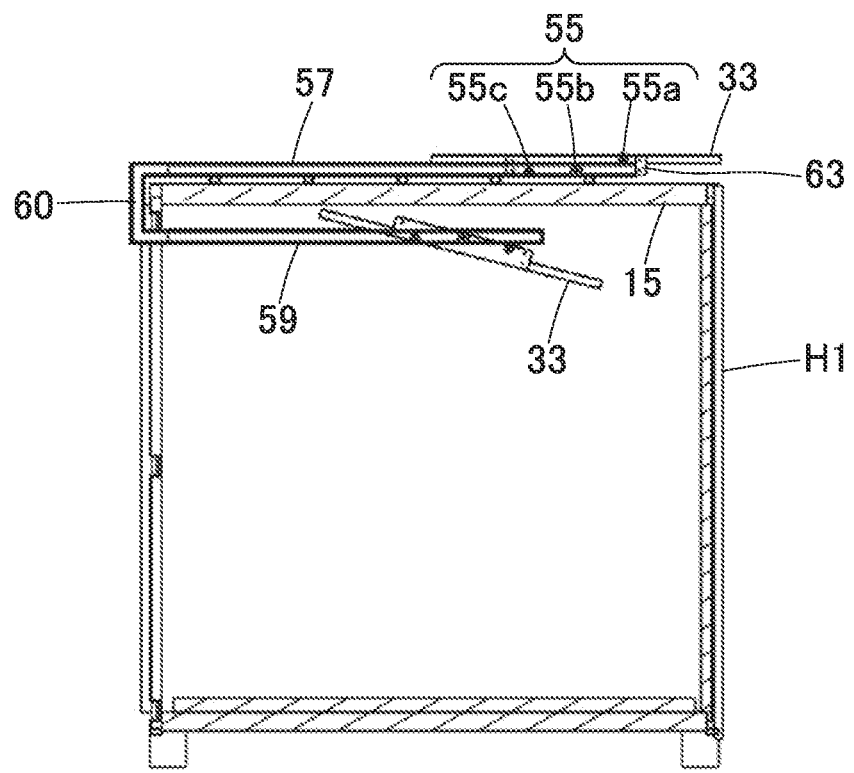
FIG. 20 is a sectional view showing a first solar panel arranged on the upper side of the top wall.

As shown in FIG. 8, FIG. 19 and FIG. 20, in each solar panel 33, the small-diameter rollers 55*a* at the frontward positions in the movement direction are guided along outer surfaces of one flanges Fg of the respective external rails 57 which are located in upper sides of the external rails, and the large-diameter rollers 55*b* in the middle and the small-diameter rollers 55*c* at the rearward positions in the movement direction are guided inside the rail grooves Rm of the external rails 57.

Internal Rail

Figure 9:
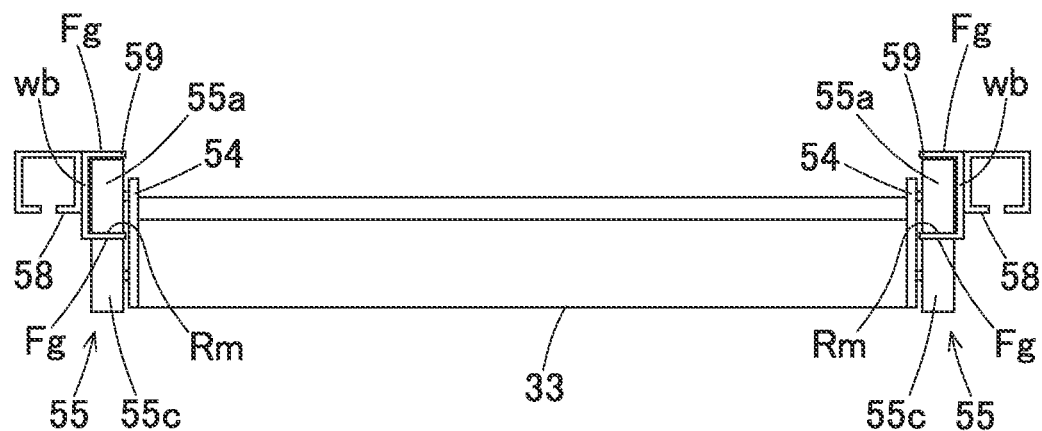
FIG. 9 is a sectional view of an internal rail and the like disposed on a ceiling inside the first housing.
Figure 10:
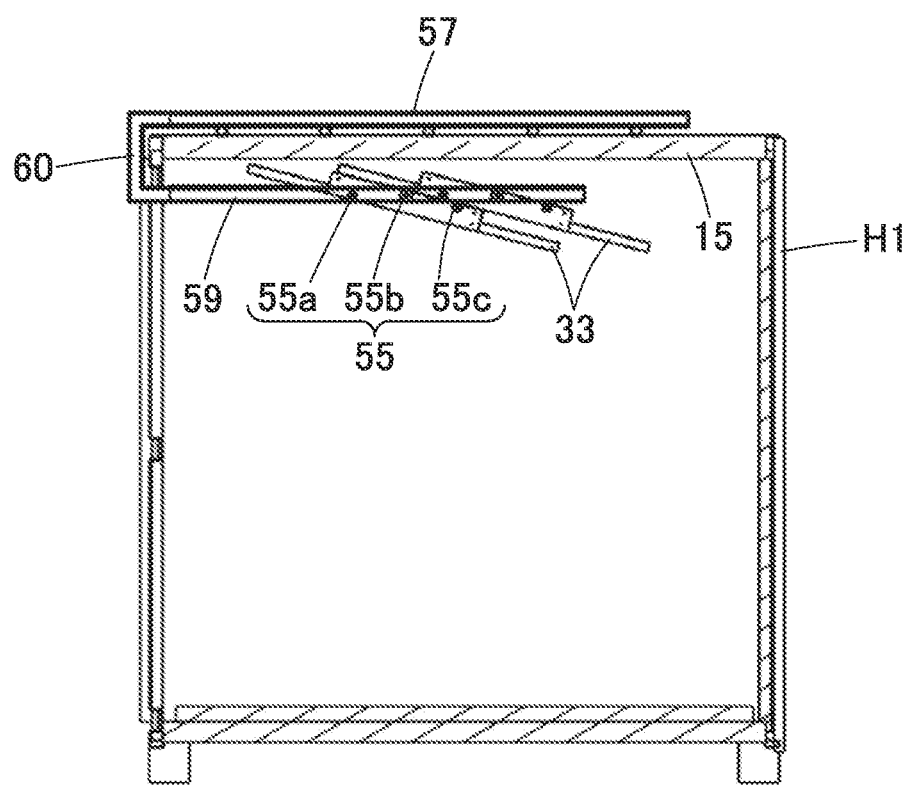
FIG. 10 is a sectional view showing the inside of the container with a connecting rail member for connecting the external rail and the internal rail.
Figure 11:
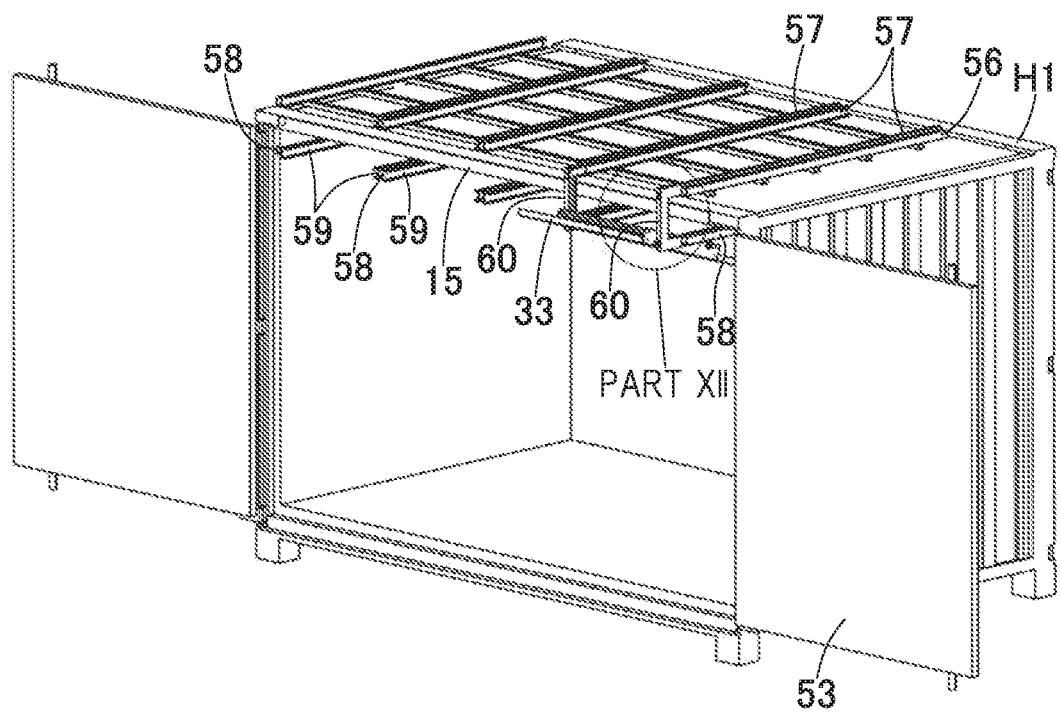
FIG. 11 is a perspective view of the first housing with the connecting rail member.

As shown in FIG. 9 to FIG. 11, inside the first housing H1, which is a freight container, a plurality of attachment metal fittings 58 extending in the front-rear direction are supported in a suspended manner by the top wall 15, which is a ceiling, and internal rails 59 are attached to the respective attachment metal fittings 58. As for the attachment metal fitting 58 located at the right end, an internal rail 59 is attached to a left-side surface of the attachment metal fitting 58. As for the attachment metal fitting 58 located at the left end, an internal rail 59 is attached to a right-side surface of the attachment metal fitting 58. To the other three attachment metal fittings 58, internal rails 59, 59 are attached to left- and right-side surfaces of the respective attachment metal fittings 58.

As shown in FIG. 9, each internal rail 59 has a groove-shaped cross section so as to define a rail groove Rm therein and includes a web Wb and flanges Fg, Fg extending in a bending manner from opposite edge portions of the web Wb so as to define the rail groove Rm. For example, the internal rail 59 is constituted by channel steel. The internal rail 59 are arranged in pairs such that opened surfaces of the rail grooves Rm of each pair face each other, and the plurality of rollers 55 attached in pairs to the two sides of each solar panel 33 are guided in the facing rail grooves Rm, Rm.

Figure 12:
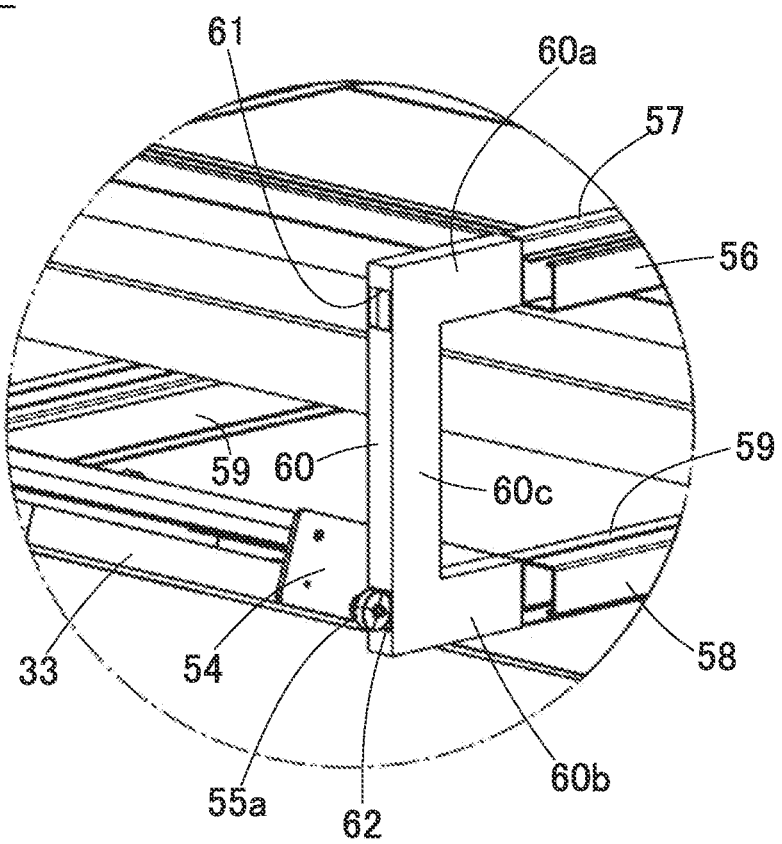
FIG. 12 is a partially enlarged perspective view of the connecting rail member and the like of FIG. 11.

As shown in FIG. 9, FIG. 10 and FIG. 12, in each solar panel 33, the rollers 55*a* at the frontward positions in the movement direction and the large-diameter rollers 55*b* are guided inside the rail grooves Rm of the internal rails 59, and the rollers 55*c* at the rearward positions in the movement direction are guided along outer surfaces of one flanges Fg of the respective internal rails 59 which are located in lower sides of the internal rails.

Connecting Rail Member

As shown in FIG. 11 to FIG. 13, the connecting rail members 60 are so-called retrofit rail members for connecting the external rails 57 and the internal rails 59 with the doors 53 of the first housing H1 opened, and are provided in a connection-releasable manner. For example, each connecting rail member 60 may be detachably coupled to attachment metal fittings 56, 58 located above and below. Alternatively, each connecting rail member may be detachably coupled to an external rail 57 and an internal rail 59 located above and below.

Figure 13A:
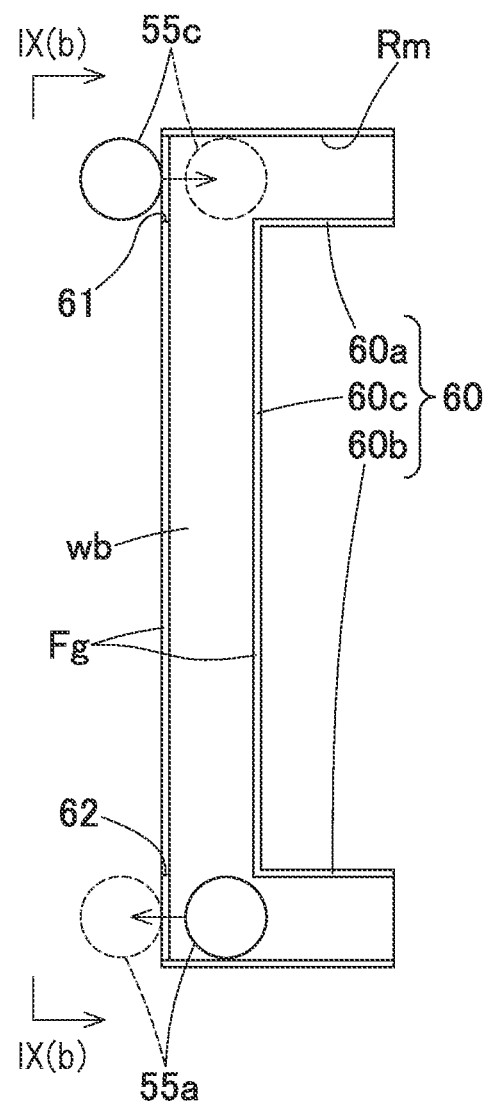
FIG. 13A illustrates the connecting rail member.
Figure 13B:
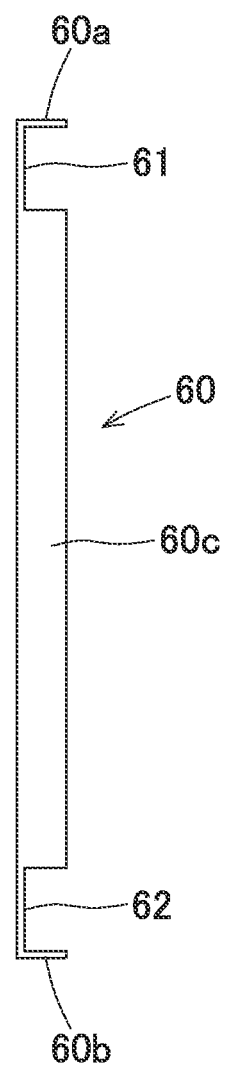
FIG. 13B is an end view along line XIIIB-XIIIB of FIG. 13A.

FIG. 12 is an enlarged view of part XII of FIG. 11. FIG. 13A is a front view of a connecting rail member 60 as viewed from the side of the rail groove Rm, and FIG. 13B is an end view along line XIIIB-XIIIB of FIG. 13A. As shown in FIG. 12 and FIG. 13A, each connecting rail member 60 has a groove-shaped cross section so as to define a rail groove Rm therein and includes a web Wb and flanges Fg, Fg extending in a bending manner from opposite edge portions of the web Wb so as to define the rail groove Rm. The connecting rail member 60 is constituted by channel steel or the like. For example, the connecting rail member 60 can be easily produced by fixing three pieces of channel steel by welding or the like. The connecting rail members 60 are arranged in pairs such that opened surfaces of the rail grooves Rm of each pair face each other, and the pluralities of rollers 55 (FIG. 10) attached in pairs to the two sides of each solar panel 33 are guided in the facing rail grooves Rm, Rm.

Each connecting rail member 60 includes an upper rail part 60a having a rail groove Rm to be connected to a rail groove Rm of a corresponding external rail 57 (FIG. 8), a lower rail part 60b having a rail groove Rm to be connected to a rail groove Rm of a corresponding internal rail 59 (FIG. 9), and a middle rail part 60c having a rail groove Rm connected to tip end portions of the rail grooves Rm of these rail parts 60a, 60b.

Of the plurality of rollers 55, the rollers 55a at the frontward positions in the movement direction are guided into the rail grooves Rm of the lower rail parts 60b. Each middle rail part 60c has a cutout 62 formed in a lower portion of one flange Fg of that middle rail part which is located outside, and the cutout 62 allows a roller 55a at the frontward position in the movement direction to exit the rail groove Rm of that middle rail part, so that a posture of the solar panel 33 can be changed. As shown in FIG. 13A and FIG. 19, of the plurality of rollers 55, the rollers 55c at the rearward positions in the movement direction are guided into the rail grooves Rm of the upper rail parts 60a. Each middle rail part 60c has a cutout 61 formed in an upper portion of one flange Fg of that middle rail part which is located outside, and the cutout 61 allows a roller 55c at the rearward position in the movement direction to be inserted into the rail groove Rm of that middle rail part. The respective cutouts 61, 62 are formed as rectangular holes and are sized so as to allow the small-diameter rollers 55a, 55c to exit and be inserted but not to allow the large-diameter roller 55b (FIG. 11) to exit.

Placement Procedure of Solar Panel

Next, a procedure for placing the solar panels 33 on the upper side 15a of the top wall 15, which is a roof of the first housing H1 (i.e., freight container), will be described. The following process may be performed using human effort, or using a machine such as a motor, or in automated operation. Of course, the solar panels 33 may be placed using a motor or the like.

Figure 14:
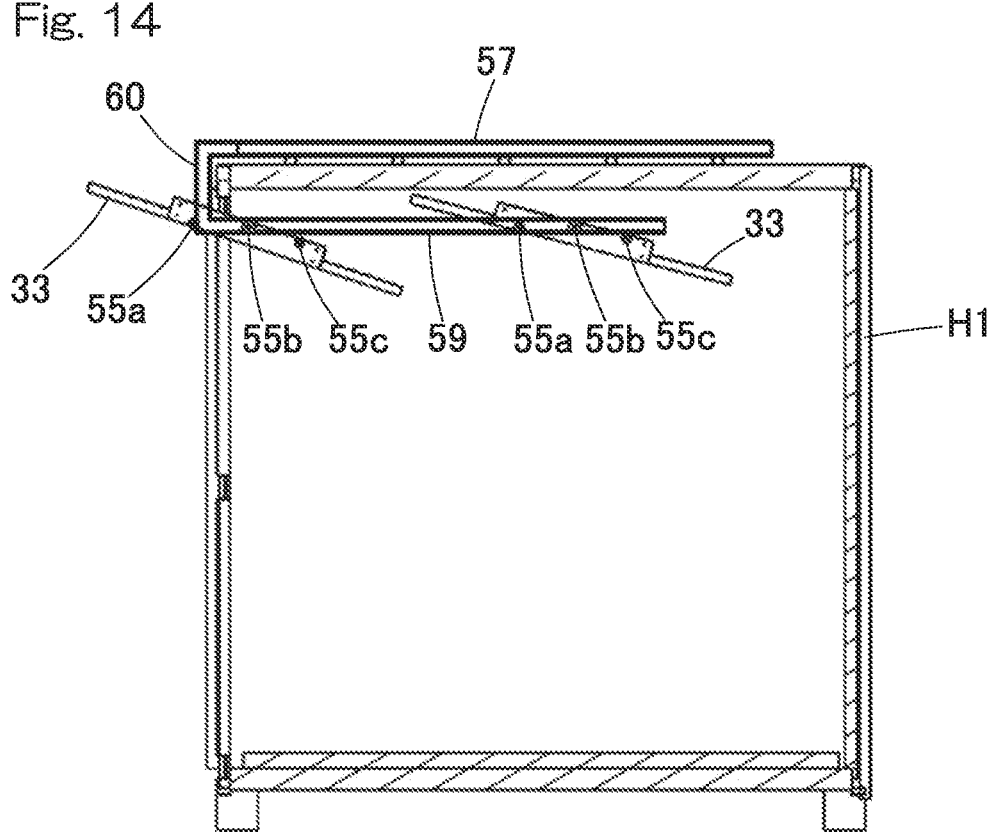
FIG. 14 is a sectional view showing movement of the solar panel guided from the internal rail to the connecting rail member.

As shown in FIG. 10 to FIG. 12, with the doors 53 of the first housing H1 opened, the external rails 57 and the internal rails 59 are connected by the connecting rail members 60. Next, a solar panel 33 supported by the internal rails 59 is guided and moved by the rollers 55 sequentially through the internal rails 59 and the connecting rail members 60. Then, as shown in FIG. 12 to FIG. 14, the small-diameter rollers 55a at the frontward positions in the movement direction are brought out from the cutouts 62 in the lower portions of the connecting rail members 60.

Figure 15:
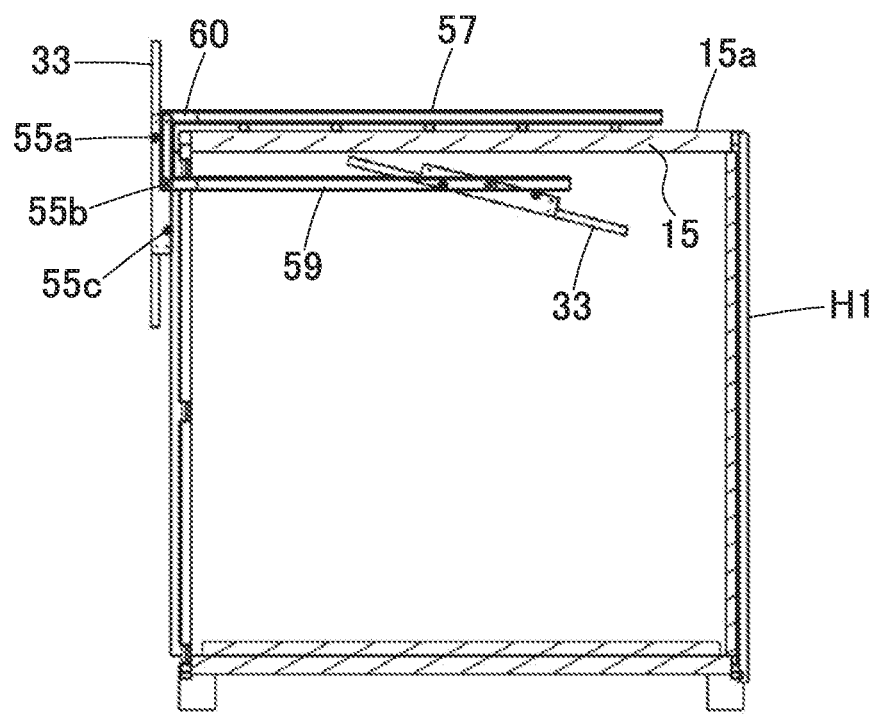
FIG. 15 is a sectional view showing the solar panel in a raised state.
Figure 16:
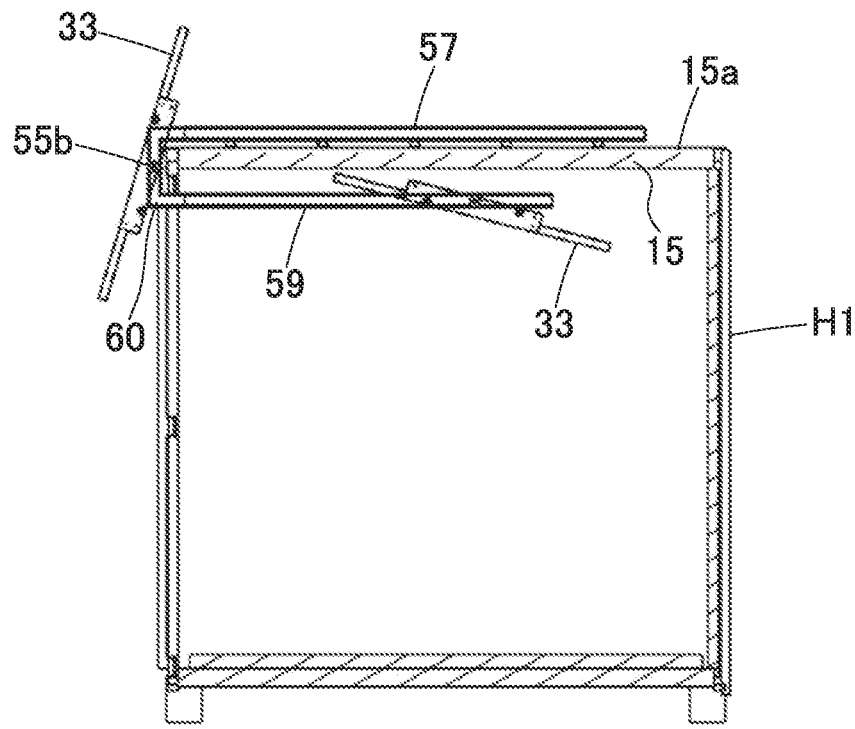
FIG. 16 is a sectional view showing the solar panel in a further displaced posture.
Figure 17:
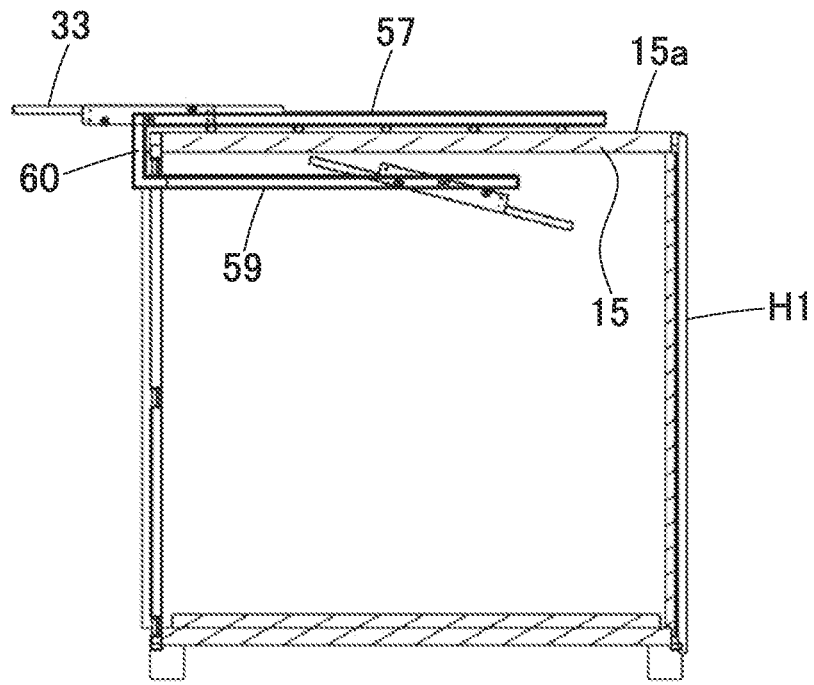
FIG. 17 is a sectional view showing the solar panel moved up on the upper side of the top wall.
Figure 18:
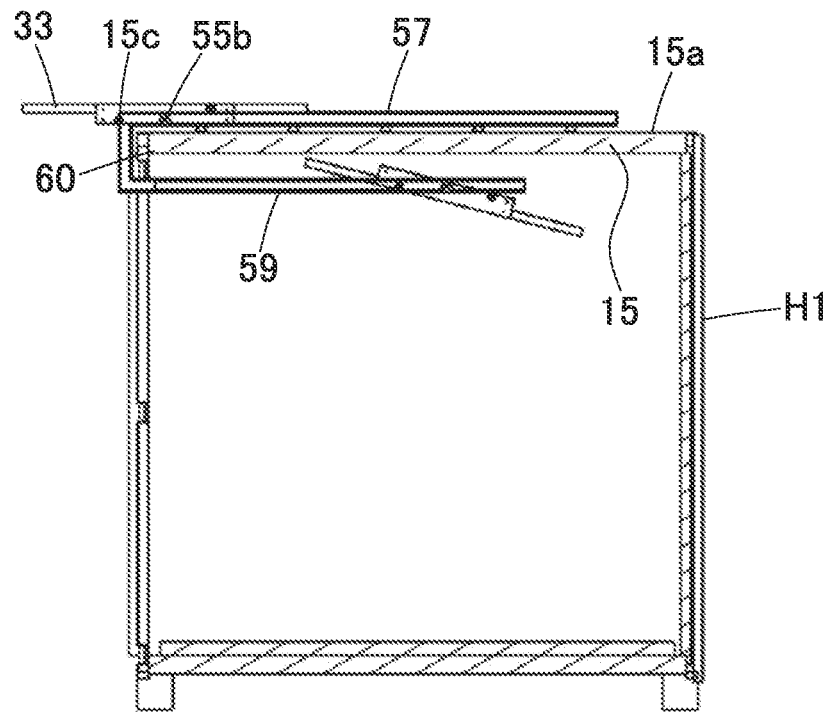
FIG. 18 is a sectional view showing insertion of a roller located at a rearward position in a movement direction into a cutout in an upper portion of the connecting rail member.

When the small-diameter rollers 55a are brought out, the large-diameter rollers 55b in the middle are not brought out from the cutouts 62, so that the posture of the solar panel 33 is changed to a desired angle around the large-diameter rollers 55b as fulcra to raise up the solar panel as shown in FIG. 15. Next, as shown in FIG. 16, the large-diameter rollers 55b are moved into the connecting rail members 60, and the solar panel 33 is brought up to the upper side 15a of the top wall 15 (FIG. 17). Then, as shown in FIG. 18 and FIG. 19, the small-diameter rollers 55c at the rearward positions in the movement direction are inserted into the connecting rail members 60 from the cutouts 61 in the upper portions of the connecting rail members 60.

Figure 21:
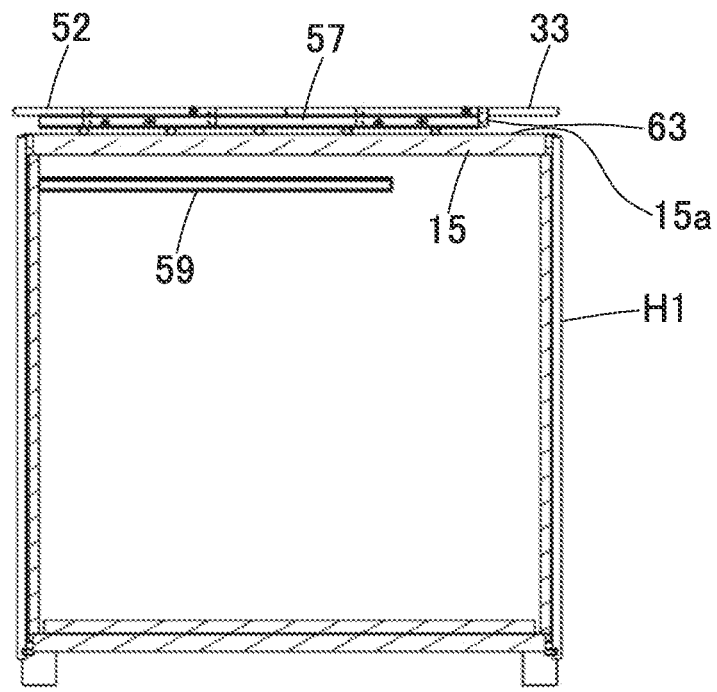
FIG. 21 is a sectional view showing a second solar panel arranged on the upper side of the top wall, with the connecting rail member removed.

Then, as shown in FIG. 20, the respective rollers 55 are guided along the external rails 57, and the solar panel 33 is moved to a predetermined position. In this case, a stopper member 63 for restricting movement of the solar panel 33 is provided at an end of each external rail 57, and the stopper member 63 prevents the solar panel 33 from moving out of the external rail 57. As shown in FIG. 21, the same process is repeated to place a second solar panel 33 on the upper side 15a of the top wall 15 in every row, and the connecting rail members are removed. FIG. 22 shows a final configuration in which eight solar panels 33 in total are placed on the upper side 15a of the top wall 15.

Such a constitution makes it possible to facilitate a deployment operation of the solar panels 33 on site and to shorten a time required to place the solar panels 33. When the solar panels 33 are attached in advance to the metal fittings which serves as mounts for the panels, and wiring for the panels is completed before placement of the solar panels 33, it is only necessary to connect a connector to a non-illustrated connection box to generate electricity by solar power generation. The electricity generated by solar power generation is applied to a non-illustrated controller to be stored in the storage battery or is supplied to power a load device which requires electricity, such as a lighting device or communication equipment.

Effects and Advantages

According to the container-accommodated mobile power generation device as described above, the connecting rail members 60 for connecting the external rails 57 and the internal rails 59 with the doors 53 of the first housing H1 (i.e., freight container) opened are provided in a connection-releasable manner, so that the first housing H1 can be transported with the connecting rail members 60 removed from the external rails 57 and the internal rails 59 to release the connections and with the doors 53 of the first housing H1 closed. When the first housing H1 is transported, the first housing H1 can be easily transported to an area of demand with the solar panels 33 supported by the internal rails 59 which are supported by the top wall 15 inside the first housing H1. Since the solar panels 33 are housed in the first housing H1 during transport of the first housing H1, the solar panels 33 are not subjected to impact from outside and thus can be easily transported.

When solar panels 33 are to be placed on the upper side 15a of the top wall 15, which is a roof of the first housing H1, the connecting rail members 60 are placed to connect the external rails 57 and the internal rails 59 with the doors 53 of the first housing H1 opened. Thus, the solar panels 33 are guided and moved by the rollers 55 from the internal rails 59 sequentially to the connecting rail members 60 and then to the external rails 57, so that the solar panels are easily placed on the upper side 15a of the top wall 15 of the first housing H1. This makes it possible to facilitate a deployment operation of the solar panels 33 on site and to shorten a time required to place them. In a reverse procedure to the above-described procedure, the solar panels 33 can be easily received into the first housing H1, which is a freight container.

Further Embodiments

In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

Figure 23:
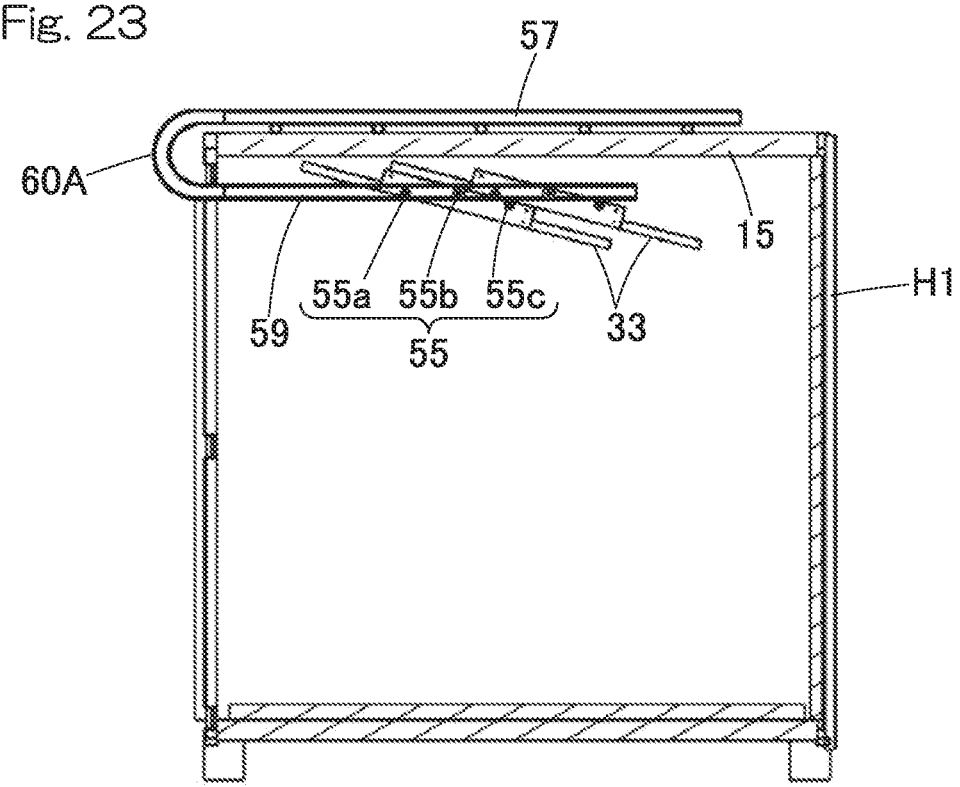
FIG. 23 is a sectional view of a power generation unit (solar power generation device) used in a portable facility according to a further embodiment of the present invention.

As shown in FIG. 23, each connecting rail member 60A may be formed in a circular arc shape. In this case, the pluralities of rollers 55 attached to the solar panels 33 can be smoothly and speedily guided along the connecting rail members 60A having the circular arc shape. In this case, it is not necessary to provide the cutouts or the like which allow the rollers 55 to be inserted into or exit the connecting rail members 60A, and it is not necessary to form the rollers 55 having large and small diameters to differentiate them, so that all the rollers can be constituted by rollers having a same configuration. Thus, the cost of the entire apparatus can be reduced.

Figure 24:
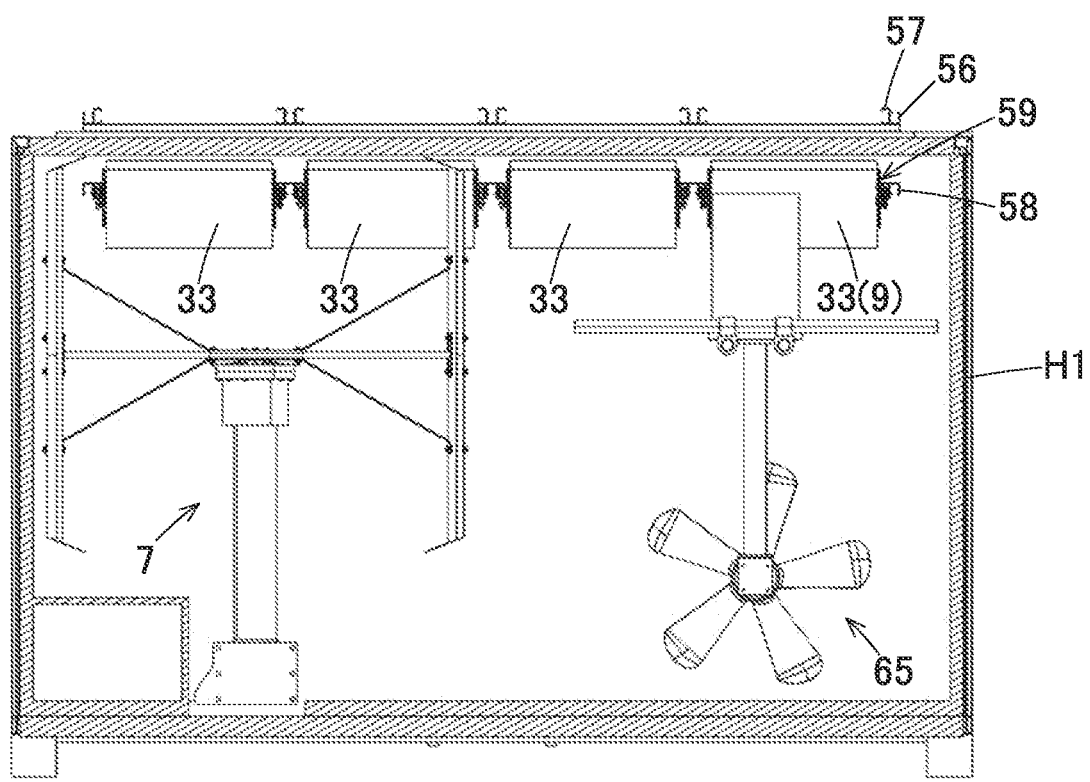
FIG. 24 is a sectional view of a power generation unit (solar power generation device) used in a portable facility according to a still further embodiment of the present invention.

As shown in FIG. 24, one or both of the wind power generation device 7 and the hydraulic power generation device 65 may be housed in the first housing H1 (i.e., freight container) which houses the solar panels 33 (solar power generation device 9). In this case, transport efficiency can be improved as compared to a case where the wind power generation device 7 and the hydraulic power generation device 65 are housed in another container or the like to be transported. This constitution is also advantageous in securing electric power.

The freight container constituting the first housing H1 is not limited to a 12-ft container and may be, for example, a container meeting an ISO standard for 20-ft dry containers, 40-ft dry containers, 45-ft dry containers, or the like.

As described above, according to the portable facility 1 of the present embodiment, the respective housings H are capable of being transported, so that the portable facility has high transportability. Further, since the power generation unit 3 includes a natural energy power generation device such as the wind power generation device 7, the solar power generation device 9, and/or the hydraulic power generation device, it is possible to use the electric apparatus 11 even in areas where it is difficult to secure power supply such as unelectrified areas and disaster areas, so that the facility 1 can be more easily operated. In particular, where the facility includes all of the wind power generation device 7, the solar power generation device 9, and the hydraulic power generation device, the power generation amount is less likely to be limited by natural environment such as weather conditions and topographical features, and/or time of the day or night, so that the facility 1 can be set up and be operated with a greater applicability to a wide range of areas.

Although the present invention has been fully described in connection with the embodiments thereof, the embodiments disclosed herein are merely examples in all respects and are not to be taken as limiting the scope of the present invention in any way whatsoever. The scope of the present invention is to be determined by the appended claims, not by the above description, and is intended to include any change made within the scope of claims or equivalent thereto.

The following describes a container-accommodated mobile power generation device according to an application configuration of the present invention, which does not require the portable facility according to an embodiment described with reference to FIG. 5 to FIG. 24 includes the function unit. The application configuration includes aspects 1 to 7 below. According to the container-accommodated mobile power generation device of the application configuration, the following effects can also be obtained. Since the connecting rail member for connecting the external rail and the internal rail with the door of the freight container opened is provided in a connection-releasable manner, the container can be transported with the connecting rail member removed from the external rail and the internal rail to release the connection and with the door of the container closed. When the container is transported, the container can be easily transported to an area of demand with the solar panel supported by the internal rail disposed on a ceiling inside the container. Since the solar panel is housed in the container during transport of the container, the solar panel is not subjected to impact from outside and thus can be easily transported.

Aspect 1

A container-accommodated mobile power generation device including:
a container having a standard dimension for freight transport; and
a solar panel capable of being housed inside the container and configured to be placed on a roof of the container to perform solar power generation,
wherein a roller is attached to the solar panel,
an external rail is provided on the roof of the container,
an internal rail is provided inside the container and is supported by a ceiling, and
a connecting rail member configured to connect the external rail and the internal rail with a door of the container opened is provided in a connection-releasable manner, so that the solar panel is allowed to be guided and moved by the roller through the internal rail, the connecting rail member, and the external rail.

Aspect 2

The container-accommodated mobile power generation device as recited in aspect 1, wherein the solar panel includes a plurality of rollers attached to opposing two sides of the solar panel, the plurality of rollers being rotatable about an axis perpendicular to the two sides,
each of the internal rail, the external rail, and the connecting rail member having a groove-shaped cross section so as to define a rail groove therein, and
in the solar panel, at least one roller of the plurality of rollers is guided into the rail groove of at least one of the internal rail, the external rail, and the connecting rail member, while at least one other roller of the plurality of rollers is guided on an outer surface of at least one of the internal rail, the external rail, and the connecting rail member.

Aspect 3

The container-accommodated mobile power generation device as recited in aspect 2, wherein each of the internal rail, the external rail, and the connecting rail member includes a web and flanges extending in a bending manner from opposite edge portions of the web so as to define the rail groove,
the first housing includes a pair of internal rails, a pair of external rails, and a pair of connecting rail members, each pair being arranged such that opened surfaces of rail grooves of that pair face each other, the rail grooves of each pair are configured to guide the plurality of rollers attached in pairs to the two sides of the solar panel, each of the connecting rail members includes an upper rail part having a rail groove to be connected to a rail groove of a corresponding external rail, a lower rail part having a rail groove to be connected to a rail groove of a corresponding internal rail, and a middle rail part having a rail groove connected to tip end portions of the rail groove of the upper rail part and the rail groove of the lower rail part, of the plurality of rollers, rollers located at frontward positions in a movement direction are guided into the rail grooves of the connecting rail members, and each of the connecting rail members has a cutout formed in one of the flanges of the middle rail part of that connecting rail member which is located outside, the cutout being configured to allow one of the rollers located at the frontward positions in the movement direction to exit the rail groove of that connecting rail member, so that a posture of the solar panel can be changed.

Aspect 4

The container-accommodated mobile power generation device as recited in aspect 3, wherein of the plurality of rollers, rollers located at rearward positions in the movement direction are guided on outer surfaces of webs of the connecting rail members, and each of the connecting rail members has a cutout formed in one of the flanges of the middle rail part of that connecting rail member which is located outside, the cutout being configured to allow one of the rollers located at the rearward positions in the movement direction to be inserted into the rail groove of that connecting rail member.

Aspect 5

The container-accommodated mobile power generation device as recited in 1 or 2, wherein the connecting rail member is formed in a circular arc shape.

Aspect 6

The container-accommodated mobile power generation device as recited in any one of aspects 1 to 5, wherein the external rail includes a stopper member configured to restrict movement of the solar panel.

Aspect 7

The container-accommodated mobile power generation device as recited in any one of claims 1 to 6, wherein one or both of a wind power generation device and a hydraulic power generation device are housed in the container which houses the solar panel.

REFERENCE NUMERALS

1 . . . portable facility
3 . . . power generation unit
5 . . . function unit
7 . . . wind power generation device
9 . . . solar power generation device
11 . . . electric apparatus
15 . . . top wall
17 . . . bottom wall
19 . . . surrounding wall
H1 . . . first housing
H2 . . . second housing

What is claimed is:

1. A portable facility comprising:

a power generation unit including a first housing that is transportable and at least one power generation device attached to the first housing, the first housing including a top wall, a bottom wall, and a surrounding wall, the at least one power generation device being one or more of a wind power generation device, a solar power generation device, and a hydraulic power generation device, and a function unit including a second housing that is transportable and an electric apparatus disposed inside the second housing and configured to be powered by the power generation unit to operate, the second housing including a top wall, a bottom wall, and a surrounding wall, wherein the first housing and the second housing are freight containers, wherein the power generation unit includes the solar power generation device, the solar power generation device is capable of being housed in the first housing, which is a freight container among the freight containers, and includes a solar panel configured to be placed on an upper side of the top wall of the first housing to perform solar power generation, a roller is attached to the solar panel, an external rail is provided on the upper side of the top wall of the first housing, an internal rail is provided inside the first housing and is supported by the top wall, a connecting rail member configured to connect the external rail and the internal rail with a door of the first housing opened is provided in a connection-releasable manner, so that the solar panel is allowed to be moved with the roller to be guided along the internal rail, the connecting rail member, and the external rail, wherein the solar panel includes a plurality of rollers attached to opposing two sides of the solar panel, the plurality of rollers being rotatable about an axis perpendicular to the two sides, each of the internal rail, the external rail, and the connecting rail member having a groove-shaped cross section so as to define a rail groove therein, and in the solar panel, at least one roller of the plurality of rollers is guided into the rail groove of at least one of the internal rail, the external rail, and the connecting rail member, while at least one other roller of the plurality of rollers is guided on an outer surface of at least one of the internal rail, the external rail, and the connecting rail member, wherein each of the internal rail, the external rail, and the connecting rail member includes a web and flanges extending in a bending manner from opposite edge portions of the web so as to define the rail groove, the first housing includes a pair of internal rails, a pair of external rails, and a pair of connecting rail members, each pair being arranged such that opened surfaces of rail grooves of that pair face each other, the rail grooves of each pair are configured to guide the plurality of rollers attached in pairs to the two sides of the solar panel, each of the connecting rail members includes an upper rail part having a rail groove to be connected to a rail groove of a corresponding external rail, a lower rail part having a rail groove to be connected to a rail groove of a corresponding internal rail, and a middle rail part having a rail groove connected to tip end portions of the rail groove of the upper rail part and the rail groove of the lower rail part, of the plurality of rollers, rollers located at frontward positions in a movement direction are guided into the rail grooves of the connecting rail members, and each of the connecting rail members has a cutout formed in one of the flanges of the middle rail part of that connecting rail member which is located outside, the cutout being configured to allow one of the rollers located at the frontward positions in the movement direction to exit the rail groove of that connecting rail member, so that a posture of the solar panel can be changed.

2. The portable facility as claimed in claim 1, wherein of the plurality of rollers, rollers located at rearward positions in the movement direction are guided on outer surfaces of webs of the connecting rail members, and each of the connecting rail members has a cutout formed in one of the flanges of the middle rail part of that connecting rail member which is located outside, the cutout being configured to allow one of the rollers located at the rearward positions in the movement direction to be inserted into the rail groove of that connecting rail member.

* * * * *